(12) United States Patent
Urakabe et al.

(10) Patent No.: US 6,621,237 B2
(45) Date of Patent: Sep. 16, 2003

(54) GAS-DISCHARGE LAMP LIGHTING APPARATUS WITH OPTIMIZED CIRCUIT CONFIGURATION

(75) Inventors: Takahiro Urakabe, Tokyo (JP); Hidehiko Kinoshita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 71 days.

(21) Appl. No.: 09/933,907

(22) Filed: Aug. 22, 2001

(65) Prior Publication Data

US 2002/0105284 A1 Aug. 8, 2002

(30) Foreign Application Priority Data

Feb. 8, 2001 (JP) .......................... 2001-032854

(51) Int. Cl.[7] .............................. H05B 41/16
(52) U.S. Cl. .................. 315/276; 315/209 R; 315/224; 315/219
(58) Field of Search .................. 315/276, 224, 315/291, 219, 209 R, 282; H05B 41/16

(56) References Cited

U.S. PATENT DOCUMENTS 5,834,903 A * 11/1998 Christian .................. 315/219
6,310,444 B1 * 10/2001 Chang ...................... 315/282
6,437,518 B1 * 8/2002 Ito et al. ................... 315/290
6,486,621 B1 * 11/2002 Novarese et al. ......... 315/308

FOREIGN PATENT DOCUMENTS

JP 5-166592 7/1993

OTHER PUBLICATIONS

Kenji Nebuya, "Electronic Ballast For Metal Halide Lamps", Sanken Gihou, vol. 26, No. 1, 1994.

* cited by examiner

Primary Examiner—Hoanganh Le
(74) Attorney, Agent, or Firm—Leydig, Voit & Mayer, Ltd.

(57) ABSTRACT

A gas-discharge lamp lighting apparatus includes: a power conditioning unit regulating power supplied from a power source, and outputting voltages with mutually different levels from two output terminals; a switching circuit unit coupled between the output terminals of the power conditioning unit and including at least one switching element; and a pulse transformer generating a high-voltage pulse, placed in a circuit connecting the output terminals of the switching circuit unit and a gas-discharge lamp. A first terminal of a primary winding of the pulse transformer is connected to a first output terminal of the power conditioning unit via a first output terminal of the switching circuit unit, and a second terminal of the primary winding is directly connected to a second output terminal of the power conditioning unit.

23 Claims, 14 Drawing Sheets

GAS-DISCHARGE LAMP LIGHTING APPARATUS WITH OPTIMIZED CIRCUIT CONFIGURATION

BACKGROUND OF THE INVENTION

The present invention generally relates to gas-discharge lamps lighting apparatus and, more particularly, to an gas-discharge lamp lighting apparatus for a vehicle or a display of the projection type.

FIG. 17 shows a construction of an gas-discharge lamp lighting apparatus according to the related art disclosed in the Japanese Laid-Open Patent Application 5-166592. FIG. 18 shows a pulse generation circuit of an igniter circuit of the related-art gas-discharge lamp lighting apparatus shown in the above-mentioned Application. Referring to FIGS. 17 and 18, reference numeral 51 indicates an inverter circuit, 52 indicates an igniter circuit, and 52a indicates a pulse generation circuit.

The igniter circuit 52 comprises a pulse generation circuit 52a which generates a pulse, and a pulse transformer PT by which the output of this pulse generation circuit 52a is stepped up. A secondary winding L2 of the pulse transformer PT is connected to a high-pressure gas-discharge lamp Lp in series, and the series circuit composed of the gas-discharge lamp Lp and the secondary winding L2 is connected with both ends of a capacitor C2. The pulse generation circuit 52a shown in FIG. 18 comprises a bi-directional switching element S4 implemented, for example, by a triac, connected to a primary winding L3 of the pulse transformer PT, a trigger element S3 triggering the switching element S4, a trigger circuit causing a breakover of the trigger element S3 and comprising a resistor R2 and a capacitor C4, and a charging circuit comprising a resistor R1 and a capacitor C3 and supplying a dc current to the series circuit composed of the primary winding L3 of the pulse transformer PT and the switching element S4. An AC power is supplied to the pulse circuit 52a via a switch SW. Only when the high-pressure gas-discharge lamp Lp is started, the switch SW supplies AC power to the pulse generation circuit 52a.

A description will now be given of the operation according to the related art.

In the pulse generation circuit 52a shown in FIG. 18, the capacitor C3 is charged via the resistor R1 when the switch SW is turned on, and the capacitor C4 is charged via the primary winding L3 of the pulse transformer PT and the resistor R2. When the voltage across the capacitor C4 reaches a breakover voltage of the trigger element S3, the electric charge of the capacitor C4 is discharged via the trigger element S3. As a result, a gate current is supplied to the switching element S4 for conduction. When the switching element S4 is turned on, the electric charge built up in the capacitor C3 is discharged via the primary winding L3 and the switching element S4. A high-voltage pulse corresponding to the turn ratio with respect to the primary winding L3 is generated in the secondary winding L2 of the pulse transformer PT. This high-voltage pulse is applied to both ends of the high-pressure gas-discharge lamp Lp via the capacitor C2. The high-voltage pulse is applied to the high-pressure gas-discharge lamp Lp so as to be superimposed on the output of the inverter circuit 51. The high-pressure gas-discharge lamp Lp is ignited by this high-voltage pulse.

Once the high-pressure gas-discharge lamp Lp is started, the switch SW is turned off so that the igniter circuit 52 stops applying the high-voltage pulse to the high-pressure gas-discharge lamp Lp. The output of the inverter circuit 51 keeps the high-pressure gas-discharge lamp Lp lighted in a stable manner.

As described above, the pulse generation circuit, constituting the igniter circuit together with the pulse transformer, comprises the bi-directional switching element, the trigger element that triggers the switching element, the trigger circuit causing a breakover of the trigger element and composed of the resistor R2 and the capacitor C4, and the charging circuit composed of the resistor R1 and the capacitor C3 and supplying a dc current to the series circuit composed of the primary winding of the pulse transformer and the switching element. Accordingly, the number of components constructing the igniter circuit is relatively large. As a result of the large number of components, the cost of the gas discharge lamp lighting apparatus is relatively high and the scale of the device is relatively large.

SUMMARY OF THE INVENTION

Accordingly, a general object of the present invention is to provide an gas-discharge lamp lighting apparatus in which the aforementioned problems are eliminated.

Another and more specific object is to provide a small-scale, low-cost gas-discharge lamp lighting apparatus by reducing the number of components constituting an igniter circuit for generating a high-voltage pulse at the discharge starting.

The aforementioned objects can be achieved by an gas-discharge lamp lighting apparatus comprising: power conditioning means regulating a power supplied from a power source, outputting voltages with mutually different levels from two output terminals, and provided with a first capacitor coupled between the two output terminals; a switching circuit unit coupled between the output terminals of the power conditioning means and comprising at least one switching element; and a pulse transformer generating a high-voltage pulse, placed in a circuit connecting the output terminals of the switching circuit unit and an gas-discharge lamp, wherein a first terminal of a primary winding of the pulse transformer is connected to a first output terminal of the power conditioning means via a first output terminal of the switching circuit unit, and a second terminal of the primary winding is directly, or via the switching circuit unit, connected to a second output terminal of the power conditioning means.

The switching circuit unit may comprise one switching element; the first terminal of the primary winding of the pulse transformer may be connected to the second output terminal of the power conditioning means via the one switching element, and the second terminal of the primary winding may be connected to the second output terminal of the power conditioning means, wherein a second capacitor is provided in a circuit connecting the pulse transformer, the gas-discharge lamp and the first output terminal of the power conditioning means, the second capacitor being connected to the gas-discharge lamp in series.

Another switching element may be provided in parallel with the second capacitor.

The switching circuit unit may comprise first and second switching elements, the first terminal of the primary winding of the pulse transformer being connected to the first output terminal of the power conditioning means via the first switching element, and the second terminal of the primary winding being connected to the second output terminal of the power conditioning means via the second switching element, and a second capacitor may be provided in a circuit connecting the pulse transformer, the gas-discharge lamp and the first output terminal of the power conditioning means, the second capacitor being connected to the gas-discharge lamp in series.

A third switching element may be provided in parallel with the second capacitor.

A third capacitor may be connected between a node, connected to the second switching element and the primary winding, and the first output terminal of the power conditioning means.

A parallel circuit formed of a diode and a resistor may be connected between the third capacitor and the node.

A current may be run through the primary winding of the pulse transformer before supplying a current from the second capacitor to the gas-discharge lamp so that a voltage between electrodes of the gas-discharge lamp is larger than a voltage maintained in the second capacitor, and the gas-discharge lamp may be ac driven by alternately performing a current feed from the power conditioning means and a current feed from the second capacitor.

The switching circuit unit may be a full-bridge inverter circuit comprising first through fourth switching elements to convert a dc output voltage of the power conditioning means into an ac voltage, and the first terminal of the primary winding of the pulse transformer may be connected to a first of two switching elements constituting an arm of the switching circuit unit, and the second terminal of the primary winding is connected to a second of the two switching elements constituting the arm.

The gas-discharge lamp lighting apparatus may further comprise initial current feed means supplying a current to the gas-discharge lamp at the discharge starting.

The initial current feed means may comprise a circuit that includes a parallel circuit formed of a resistor and a diode, and a series circuit connecting a fourth capacitor and an inductor.

A third capacitor may be connected between a node, connected to the first of the switching elements and the primary winding, and the first output terminal of the power conditioning means.

A parallel circuit formed of a diode and a resistor may be connected between the third capacitor and the node.

The aforementioned objects can also be achieved by an gas-discharge lamp lighting apparatus comprising: power conditioning means regulating a power supplied from a power source, and outputting voltages with mutually different levels from two output terminals; a switching circuit unit coupled between the output terminals of the power conditioning means and comprising at least one switching element; a capacitor placed in a circuit connecting the output terminals of the switching circuit unit and an gas-discharge lamp; and a pulse transformer connected between the capacitor and the gas-discharge lamp, wherein a first terminal of a primary winding of the pulse transformer is connected to a first electrode of the capacitor, and a second terminal of the primary winding is connected to a second electrode of the capacitor via a switching element, and there is provided a charging circuit for charging the capacitor.

The switching circuit unit may comprise one switching element.

The switching circuit unit may comprise two switching elements.

A current may be run through the primary winding of the pulse transformer before supplying a current from the capacitor to the gas-discharge lamp so that a voltage between electrodes of the gas-discharge lamp is larger than a voltage maintained in the capacitor, and the gas-discharge lamp may be ac driven by alternately performing a current feed from the power conditioning means and a current feed from the capacitor.

A charging circuit switching element may be provided in the charging circuit.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

First Embodiment

Figure 1:
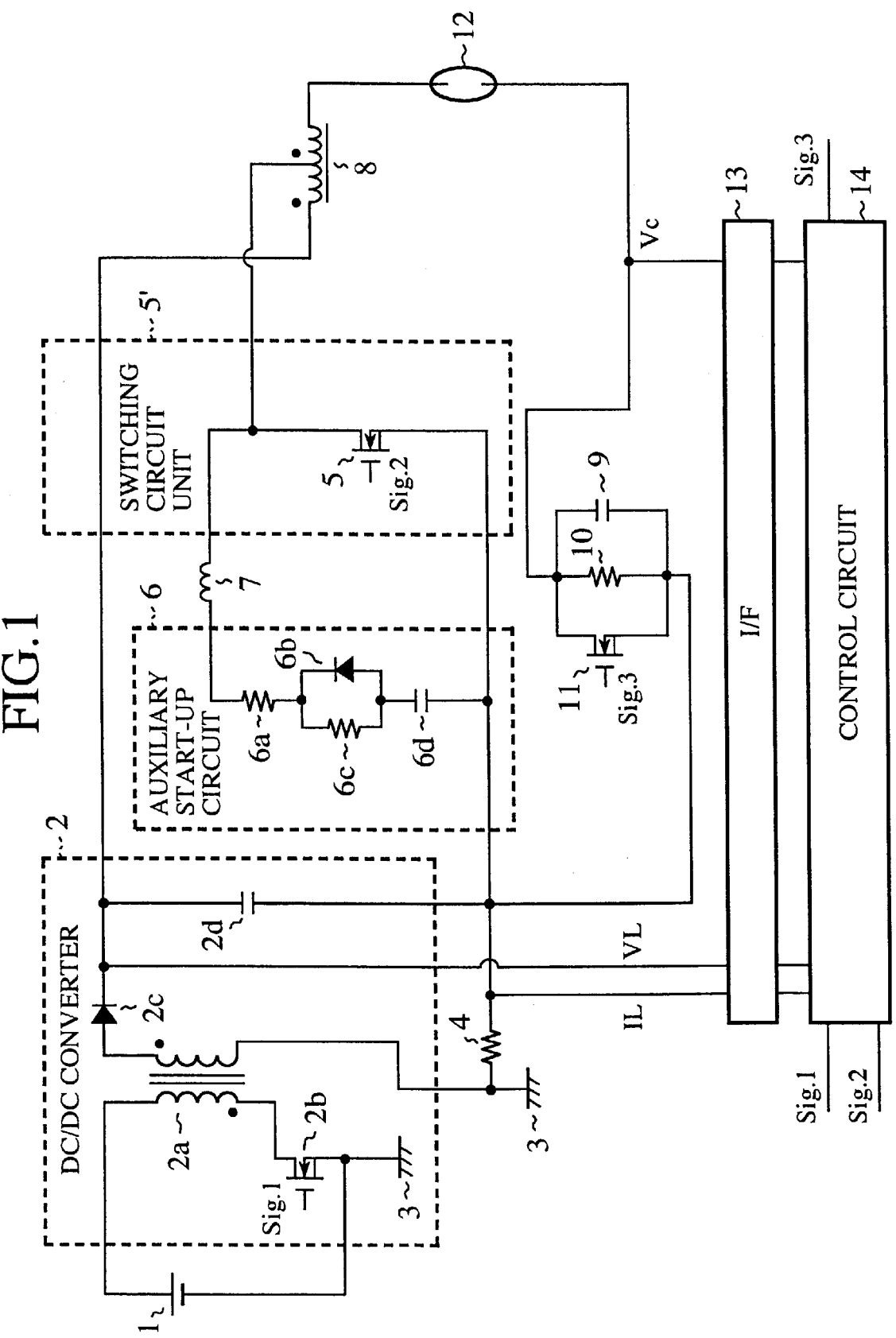
FIG. 1 shows an gas-discharge lamp lighting apparatus according to a first embodiment of the present invention.

FIG. 1 shows an gas-discharge lamp lighting apparatus according to a first embodiment of the present invention. Referring to FIG. 1, reference numeral 1 indicates a direct-current power supply, 2 indicates a DC/DC converter, 2a indicates a transformer which constitutes the DC/DC converter 2, and 2b indicates an FET which is the switching element. 2c indicates a diode, and 2d indicates a capacitor having the function of supplying a current to the gas-discharge lamp at the discharge starting and smoothing the output voltage. 3 indicates an earth, 4 indicates a shunt resistance by which an gas-discharge lamp current is converted into a voltage, and 5 indicates an FET constituting a switching circuit unit 5'. 6 indicates an auxiliary start-up circuit, 6a is a resistor of 1–100 Ω constituting the auxiliary start-up circuit 6. 6b indicates a diode, 6c indicates a resistor of 1000–10000 Ω. 6d indicates a capacitor. 7 indicates an inductor for delaying a current which flows from the capacitor 6d at the discharge starting, and 8 indicates a pulse transformer with a turns ratio of 1:100 for applying a high voltage of about 20 kV to the gas-discharge lamp 12 at the discharge starting. 9 indicates an electrolytic capacitor of 1–1000 μF, and 10 indicates a resistor for protection. 11 indicates an FET which is a switching element to reset the electric charge of the electrolytic capacitor 9, 12 indicates an gas-discharge lamp, and 13 indicates an interface circuit (hereafter, referred to as I/F) to convert an output voltage VL of the DC/DC converter 2, a voltage Vc of the electrolytic capacitor 9 and a current IL which flows in the gas-discharge lamp 12 into signals of 0–5V. 14 indicates a control circuit which controls each of the FETs 2b, 5, and 11, which are the switching elements, according to the values of VL, Vc, and IL input from the I/F 13.

In the first embodiment, the DC/DC converter 2, the I/F 13, and the control circuit 14 constitute a power conditioning means. The power conditioning means regulates the electric power supplied from the power supply 1 so as to output voltages of different levels via the two output terminals of the DC/DC converter 2. The capacitor 2d (first capacitor) is connected between the two output terminals.

The switching circuit unit 5' comprises the FET 5, which is the switching element. The drain of the FET5 constitutes the first output terminal of the switching circuit unit 5' and the source of the FET5 constitutes the first input terminal of the switching circuit unit 5'. The two input terminals of the switching circuit unit 5' are connected with the two output terminals of the DC/DC converter 2 of the power conditioning means. The second input terminal of the switching circuit unit 5' is connected with the second output terminal (on the high-voltage side) of the DC/DC converter 2. The second input terminal of the switching circuit unit 5' is also connected with the second output terminal of the switching circuit unit 5' inside the switching circuit unit 5'.

The pulse transformer 8, which generates the high-voltage pulse, is placed in a circuit connecting the output terminals of the switching circuit unit 5' with the gas-discharge lamp 12.

A description will now be given of the circuit connection.

Referring to FIG. 1, the positive side of the direct-current power supply 1 is connected with the end of the primary winding of the transformer 2a. The start of the primary winding is connected with the drain of the FET 2b. The earth 3 is connected to the source of the FET2b and the negative side of the direct-current power supply 1. A signal Sig.1 from the control circuit 14 is input to the gate of the FET 2b.

The start of the secondary winding of the transformer 2a is connected with the anode of the diode 2c, and the end of the winding is connected with the earth 3. The cathode of the diode 2c is connected with the first electrode of the capacitor 2d and the start of the primary winding of the pulse transformer 8.

The node between the end (first terminal) of the primary winding of the pulse transformer 8 and the start of the secondary winding is connected with the drain of the of FET 5 and the first terminal of the inductor 7. The second terminal of the inductor 7 is connected with the first terminal of the resistor 6a in the auxiliary start-up circuit 6. The second terminal of the resistor 6a is connected with the cathode of the diode 6b and the first terminal of the resistor 6c. The second terminal of the resistor 6c is connected with the anode of the diode 6b and with the first electrode of the capacitor 6d. The second electrode of the capacitor 6d and the source of the FET5 are connected with the second electrode of the capacitor 2d and the first electrode of the shunt resistance 4. The second terminal of the shunt resistance 4 is connected with the earth 3. A signal Sig.2 from the control circuit 14 is input to the gate of the FET5.

The end of the secondary winding of the pulse transformer 8 is connected with the first electrode of the gas-discharge lamp 12, and the second electrode of the gas-discharge lamp 12 is connected with the first electrode of the electrolytic capacitor 9, the first terminal of the resistor 10, and the drain of the FET11. The second electrode of the electrolytic capacitor 9 and the second terminal of the resistor 10 are connected with the source of the FET 11, and connected with the earth 3 via the shunt resistance 4. A signal Sig.3 from the control circuit 14 is input to the gate of the FET 11.

The end (first terminal) of the primary winding of the pulse transformer 8 is connected with the first output terminal of the DC/DC converter 2 of the power conditioning means, connected with the first input terminal of the switching circuit unit 5', via the first output terminal of the switching circuit unit 5'. The start of the primary winding (second terminal) is connected with the second output terminal of the switching circuit unit 5' connected directly with the second output terminal of the DC/DC converter 2 of the power conditioning means.

Therefore, the electrolytic capacitor 9, which is the second capacitor connected with the gas-discharge lamp 12 in series, is placed in a circuit which connects the pulse transformer 8, gas-discharge lamp 12, and the first terminal of the DC/DC converter 2 of the power conditioning means. Moreover, the FET 11, which is the switching element, is placed in parallel with the electrolytic capacitor 9.

A detection voltage VL is an output voltage of the DC/DC converter 2 occurring at the cathode of the diode 2c. The detection voltage Vc is a voltage of the electrolytic capacitor 9. The detection current IL is detected in the form of a voltage developed across the shunt resistance 4 by the gas-discharge lamp current. VL, Vc, and IL are input to the I/F 13, respectively. They are converted into signals of 0–5 V which can be processed by the control circuit 14. The FETs 2b, 5, and 11 are controlled using the control signals Sig.1, Sig.2, and Sig.3, respectively, in accordance with the values preset in the control circuit 14.

The circuit formed by a series connection of the auxiliary start-up circuit 6 and the inductor 7 constitutes the initial current feed means to supply the current to the gas-discharge lamp at the discharge starting.

The auxiliary start-up circuit 6, which constitutes the initial current feed means, consists of a parallel circuit formed by the resistor 6c and the diode 6b, and by the capacitor 6d (fourth capacitor) and the resistor 6a.

A description will now be given of the operation.

Figure 2:
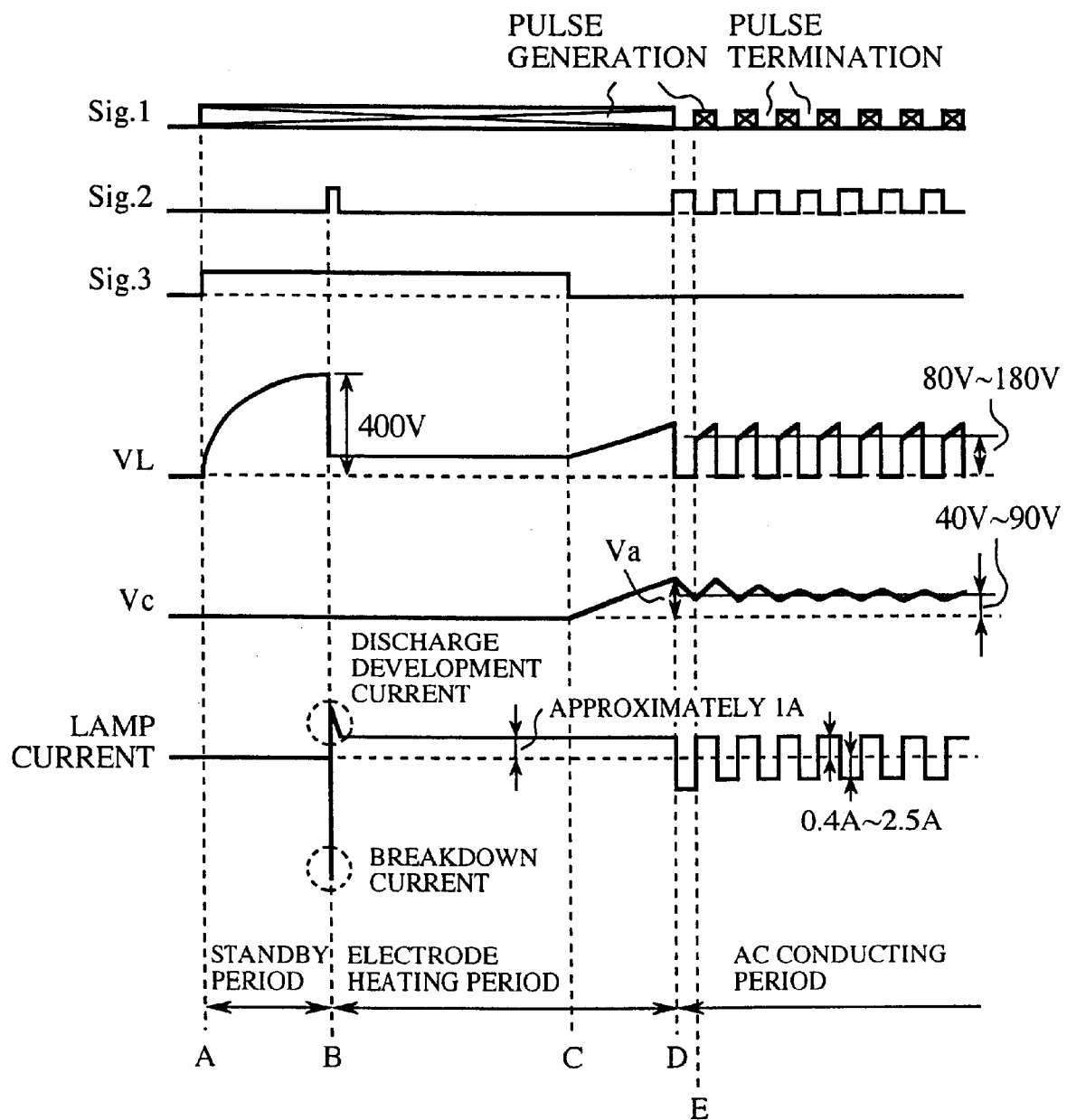
FIG. 2 is timing chart showing the waveforms of the control signals, the detected voltages, and the gas-discharge lamp current.

FIG. 2 is timing chart showing the waveforms of the control signals Sig.1, Sig.2, and Sig.3, the voltages VL and Vc, and the waveform of the gas-discharge lamp current.

When the switch of the power supply is turned on, the control signal Sig.3 goes high so that the FET 11 is turned on. The control signal Sig.2 goes low so that the FET 5 is turned off (A of FIG. 2). The control signal Sig.1 is a pulse signal of 100 kHz. The control signal Sig.1 is controlled while comparing the voltage VL and a preset voltage value. By controlling the gate of the FET 2b of the DC/DC converter 2, the voltage VL rises monotonically to 400 V, thus charging the capacitor 2d (B of FIG. 2). The capacitor 6d is charged at the same time. This period is called a standby period.

In the standby period, the control signal Sig.1 supplied from the control circuit 14 to the gate of the FET 2b is controlled so that the voltages accumulated in the capacitor 2d and the capacitor 6d reach 400 V. When it is determined that the voltages of the capacitor 2d and the capacitor 6d are 400 V, the control signal Sig.2, supplied to the gate of the FET 5, is brought to a high level for 100 nsec–10 μsec so that the FET 5 is turned on (B of FIG. 2). Then, the electric charge of 400V accumulated in the capacitor 2d, is rapidly drained via the primary winding of the pulse transformer 8 and the FET 5. As a result of a primary current thus generated, a high voltage of about 20 kV is generated in the secondary winding of the pulse transformer 8 so that the gas discharge begins in the gas-discharge lamp 12. At that time, a current of a high peak and a short pulse width (breakdown current) flows in the gas-discharge lamp 12. At the same time as the voltage across the gas-discharge lamp 12 rapidly decreases, the electric charge, which has been stored in the capacitor 6d of the auxiliary start-up circuit 6 of the DC/DC converter 2, flows into the gas-discharge lamp 12, so that the gas discharge is sustained (discharge development current). Thereafter, the current of about 1 A continues to be supplied to the gas-discharge lamp 12 by the DC/DC converter 2. Since the FET 11 is being turned on, the voltage across the electrolytic capacitor 9 is retained 0V.

A description will now be given of the operation of the inductor 7. The FET 5 is turned on when the gas discharge is started so that the energy, which has accumulated in the capacitor 2d, is transferred to the primary winding of the pulse transformer 8. Without the inductor 7, the electric charge, which has been accumulated in the capacitor 6d, is simultaneously consumed via the FET 5, and, as a result, the voltage of the capacitor 6d decreases.

The electric charge stored in the capacitor 6d has an important role of supplying the current (discharge development current) to sustain the gas discharge of the gas-discharge lamp 12 immediately after the gas-discharge lamp 12 starts the gas discharge, until the current-feed capability of the DC/DC converter 2 takes effect. Therefore, voltage drop in the capacitor 6d will result in reduction of the discharge development current. The reduction in this discharge development current will cause dying out of the gas discharge. By introducing the inductor 7 to prevent this, the loss of energy stored in the capacitor 6d, caused by the turn-on of the FET 5 for several microseconds for the discharge starting, can be reduced significantly. A sufficient discharge development current can be supplied to the gas-discharge lamp due to the function of the inductor 7. It is thus not likely that the dying out of the gas discharge occurs immediately after the discharge starting.

When a predetermined quantity of charge is supplied to the gas-discharge lamp 12 (when a predetermined energy is supplied to the gas-discharge lamp 12), the FET 11 is turned off (C of FIG. 2). The charging of the electrolytic capacitor 9 and the energy supply to the gas-discharge lamp 12 are performed at the same time subsequent to the discharging of the gas-discharge lamp. Associated with the charging of the electrolytic capacitor 9 and the energy supply to the gas-discharge lamp 12, the voltage Vc begins to develop. When a predetermined energy is supplied to the gas-discharge lamp 12, and the voltage Vc reaches a predetermined level (D of FIG. 2), the operation of the apparatus proceeds to a next step. A period in which the dc current continues to be supplied to gas-discharge lamp is referred to as an electrode heating period (period of D from B of FIG. 2). The electrode heating period has a role of heating the electrode of the gas-discharge lamp, thereby lowering the discharge voltage sufficiently so that the subsequent discharges proceeds smoothly. The voltage Vc is such that the voltage VL-Vc is within the range from +10V to +50V. Since the period of time in which the FET 11 remains turned on can be desirably set, the optimum energy can be supplied to the gas-discharge lamp in the electrode heating period.

When the voltage Vc grows to a set value of the control circuit (D of FIG. 2), the control signal Sig.1 is brought to a low level (the pulse is stopped) so that the FET 2b of the DC/DC converter 2 is turned off, thereby stopping the operation of the DC/DC converter 2. The control signal Sig.2 is brought to a high level so that the FET 5 is turned on. Then, the energy stored in the electrolytic capacitor 9 is drained to the gas-discharge lamp 12. A current with a polarity opposite to that of the preceding electrode heating period flows in the gas-discharge lamp 12. Since the electrolytic capacitor 9 is of a large capacity of 100 μF, and a sufficient energy is stored during the electrode heating period, the electrolytic capacitor 9 is capable of supplying the discharge current to the gas-discharge lamp 12. When the current is supplied from the electrolytic capacitor 9 to the gas-discharge lamp 12 for a predetermined period of time, the FET 5 is turned off (E of FIG. 2) by bringing the control signal Sig.2 to a low level again. The pulse of 100 kHz is generated as the control signal Sig.1 and supplied as the gate signal of the FET 2b. With this, the DC/DC converter 2 is operated so that the electric charge is supplied to the gas-discharge lamp 12. After a predetermined period of time, the operation of the DC/DC converter 2 is stopped by bringing the control signal Sig.1 to a low level, i.e. by stopping the pulse. The FET 5 is turned on by bringing the control signal Sig.2 to a high level.

A cycle period of the generation of the pulse of the control signal Sig.1 and the suspension thereof is 200 Hz or greater. The period subsequent to E is called an AC conducting period. The power control is performed by comparing the current output IL, the voltage outputs VL and Vc with the set value of the control circuit. After the AC conducting period sets in, the FET 2b of the DC/DC converter 2 is controlled promptly according to the signal Sig.1 to maintain the electric power 34W. In principle, when the FET5 is turned on by bringing the control signal Sig.2 to a high level, the pulse of the control signal Sig.1 is stopped so that the DC/DC converter 2 is not operated. The FET 11 remains turned off during the AC conducting period since the control signal Sig.3 is maintained at a low level.

In principle, the operating period of the DC/DC converter 2 is ensured not to concur with the ON period of the FET 5 in the AC conducting period. If the concurrence occurs, a short-circuit current flows so that the power loss occurs.

Moreover, the FET 5 is turned on after an elapse of 10–1000 μsec following the suspension of the operation of the DC/DC converter 2. The purpose of this is to use the electric charge accumulated in the capacitor 2d to cause the discharge in the gas-discharge lamp. As a result, the power loss due to the capacitor 2d electric charge is also reduced.

When the polarity is inverted in a transition from electrode heating period to AC conducting period, and when the polarity is inverted in a transition, occurring as several pulses are asserted at the start of the AC conducting period, between the current-feed by the DC/DC converter 2 and the current-feed by the electrolytic capacitor 9, the dying out phenomenon of the gas discharge might be caused. There is a probability of about 50% that the ignition fails due to the dying out of this gas discharge. Especially, this phenomenon is often caused when lighting an old gas-discharge lamp in which the electrode is so consumed that the voltage for maintaining the lighted state has increased.

The electrode heating period is provided to prevent the dying out. By continuously supplying the dc energy of a constant magnitude to the gas-discharge lamp in the electrode heating period, both electrodes of the gas-discharge lamp are heated and the level of voltage in the gas-discharge lamp is lowered, thereby ensuring that the discharge is generated subsequently. However, since the electrode wear of the gas-discharge lamp 12 is promoted if the electrode heating period is excessively long, the quantity of charge supplied in the electrode heating period is controlled to be 30–40 mC according to the first embodiment. The reason that the dying out of the gas discharge is observed only at the beginning of the AC conducting period is that the heating of the electrode is insufficient, and the voltage of gas-discharge lamp is not stable.

However, it is difficult to eliminate the dying out of the gas discharge of an old lamp completely, only by employing the above-mentioned lighting method in which the electrode heating period is introduced. The reason that the dying out of the gas discharge is likely to occur when the polarity is inverted in a transition from the current-feed by the DC/DC converter 2 to the current-feed by the electrolytic capacitor 9 is that the voltage applied to the gas-discharge lamp 12 at the inversion includes only the voltage component of the electrolytic capacitor 9 at that time. In contrast, when the polarity is inverted in a transition from the current-feed by the electrolytic capacitor 9 to the current-feed by the DC/DC converter 2, the voltage source is switched to the DC/DC converter 2. The dying out of the gas discharge at this period is not likely to be caused because the electric charge is built up in the capacitor 2d until the gas discharge is caused and the voltage thus built up is applied to the gas-discharge lamp 12. The dying out phenomenon could occur in the related-art gas-discharge lamp lighting apparatus constituted by a half bridge circuit and a capacitor.

Figure 3:
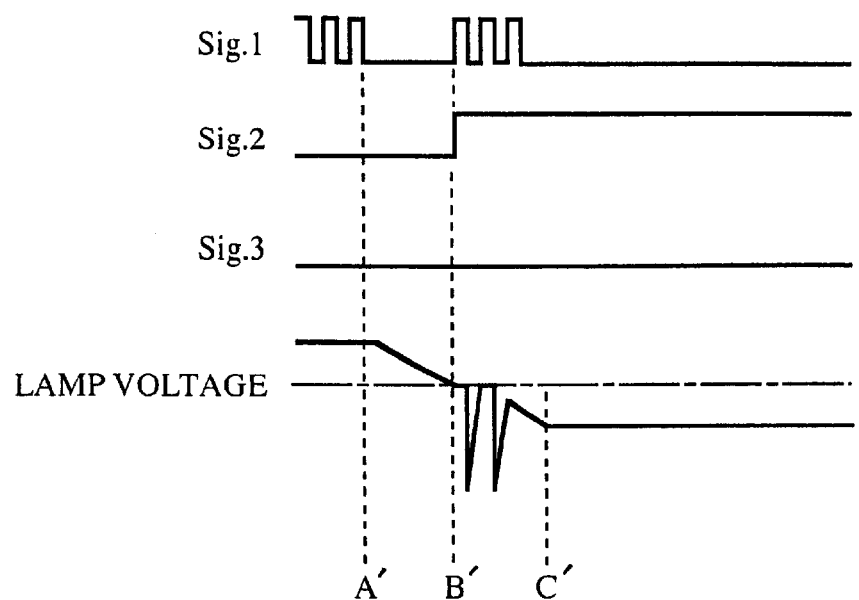
FIG. 3 shows the control signals and the voltage in the gas-discharge lamp.

In the first embodiment, the voltage developed in the gas-discharge lamp is raised when the polarity is inverted in a transition from the electrode heating period to the AC conducting period and when the polarity is inverted in an initial stage of the AC conducting period in which the current-feed by the DC/DC converter 2 is switched to the current-feed by the electrolytic capacitor 9, thereby preventing the dying out of the gas discharge from occurring. FIG. 3 shows the method described above.

FIG. 3 shows the control signals Sig.1, Sig.2 and Sig.3 supplied to the gates of the FET 2b, 5, and 11, respectively, when the polarity of the gas discharge of the gas-discharge lamp 12 is inverted as a result of stopping the operation of the DC/DC converter 2 and turning the FET 5 on. FIG. 3 also shows the voltage (voltage of gas-discharge lamp) between the electrodes of gas-discharge lamp 12.

A description will now be given of the operation.

By turning off the FET 2b by bringing the control signal Sig.1 to a low level, the operation of the DC/DC converter 2 is stopped (A' of FIG. 3). The voltage in the gas-discharge lamp drops gradually. When the voltage approaches zero, several voltage pulses of the control signal Sig. 1, consisting of high-voltage pulses and low-voltage pulses, are generated at the same time as the control signal Sig.2 is brought to a high level and the FET 5 is turned on (B' of FIG. 3). The voltage pulse of the control signal Sig.1 is a pulse signal of 10 μsec which is the cycle by which the DC/DC converter 2 is normally operated. The DC/DC converter 2 generates a pulse current. The pulse current flows in the primary winding of the pulse transformer 8 and causes the pulse voltage in the secondary winding. The pulse voltage of 200–250 V corresponding to the number of pulses of the control signal Sig.1 occurs between the electrodes of the gas-discharge lamp 12, if the gas-discharge lamp 12 is in a high impedance state. The gas discharge of the inverted polarity starts by 1–2 pulses, the voltage in the gas-discharge lamp becomes the same voltage as that of the electrolytic capacitor 9 so that the gas discharge is sustained (subsequent to C' of FIG. 3).

As mentioned above, according to the first embodiment, a current is supplied to the primary winding of the pulse transformer 8 before a current is supplied from the electrolytic capacitor 9 (second capacitor) to the gas-discharge lamp 12. Thus, the voltage between the electrodes of the gas-discharge lamp 12 is ensured to be larger than the voltage maintained in the second electrolytic capacitor 9. The gas-discharge lamp 12 is AC driven by alternately performing the current-feed from the DC/DC converter 2 of the power conditioning means and the current-feed from the second electrolytic capacitor 9.

The voltage supply of the power supply 1 is stopped when turning off the light (power supply OFF). The power supply in the control circuit 14 and the I/F 13 has a capacitance so that the drive voltage can be maintained for a while after the power supply 1 is turned off. For a while after the power supply is turned off, the FETs 2b, 5, and 11, which are the switching elements, can be controlled. When the power supply is turned OFF, the control signal Sig.1 supplied to the gate of the FET 2b goes low, thereby stopping the operation of the DC/DC converter 2. The control signal Sig.2 supplied to the gate of the FET 5 goes high so that the FET 5 is turned on. The voltage in the electrolytic capacitor 9 is made to drop while performing the energy supply from the electrolytic capacitor 9 to the gas-discharge lamp 12. When the voltage of the capacitor drops to about 40V, the gas-discharge lamp gas discharge cannot be sustained so that the gas-discharge lamp 12 enters a state of non-lighting. The electric charge of about 40 V remaining in the electrolytic capacitor 9 drops to 0 V by turning on the FET 11 by bringing the control signal Sig.3, supplied to the gate of the FET 11, to a high level. This concludes the extinguishing operation.

The FET 5 of the switching element has been described as being implemented by a MOSFET. It is needless to say that a similar effect is provided even if this is replaced with an IGBT (insulated gate bipolar transistor). An IGBT is desirable. A current is supplied to the primary winding of the pulse transformer 8 via the FET 5 at the discharge starting, as previously stated. The larger this primary winding current, the larger the voltage that occurs in the secondary winding. Therefore, the switching element for supplying the primary winding current preferably sustains a large instantaneous current. An IGBT is known as a more suitable element for supplying a heavy current than a MOSFET. Therefore, an IGBT is more desirable than a MOSFET.

As described, according to the invention, the switching element and the smoothing capacitor perform the function of the related art circuit components in the high-voltage pulse generation circuit unit (igniter circuit unit). Thereby, the number of circuit components is reduced (elimination of circuit components other than the pulse transformer).

As mentioned above, according to the first embodiment, the igniter circuit is composed only of a pulse transformer, the switch performs the function of the bridge circuit, and the function of the capacitor for energy supply of the primary winding is covered by the smoothing capacitor at the output of the DC/DC converter. Therefore, of those components necessary for generation of the high-voltage pulse for the discharge starting, the circuit components other than the pulse transformer can be eliminated. Thus, the scale and cost of the device can be reduced.

Since the magnitude of energy continuously supplied to the gas-discharge lamp in the electrode heating period is optimized by providing the switching element in parallel with the second capacitor, the subsequent gas discharge is easily sustained.

By causing a current to flow in the primary winding of the pulse transformer when the polarity is inverted in a transition from the electrode heating period to the AC conducting period, and when the polarity is inverted in an initial stage of the AC conducting period in a transition to the current feed by the second capacitor to the gas-discharge lamp, a large voltage is developed across the electrodes of the gas-discharge lamp. Accordingly, the dying out phenomenon that occurs when the polarity is inverted in a transition from the electrode heating period to the AC conducting period and during an initial stage of the AC conducting period is eliminated. As a result, an gas-discharge lamp lighting apparatus with an excellent lighting performance is obtained.

Further, since it is ensured that a sufficient discharge development current is supplied to the gas-discharge lamp, the dying out of the gas discharge immediately after the discharge starting is prevented from occurring.

Second Embodiment

Figure 4:
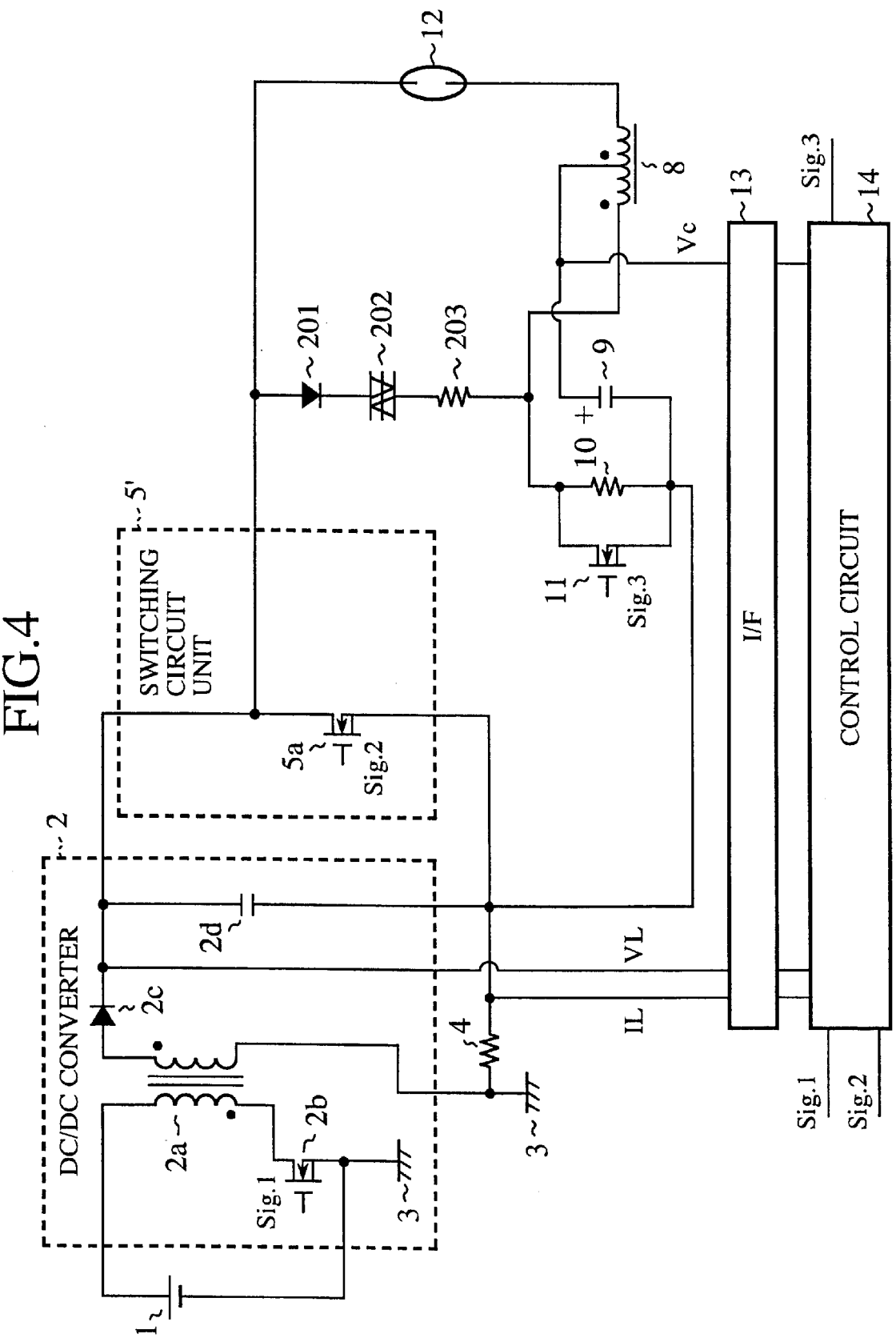
FIG. 4 shows an gas-discharge lamp lighting apparatus according to a second embodiment of the present invention.

FIG. 4 shows an gas-discharge lamp lighting apparatus according to the second embodiment of the present invention. In the first embodiment, the pulse transformer 8 is arranged between the gas-discharge lamp 12 and the cathode of the diode 2c of the DC/DC converter 2. A node between the end of the primary winding and the start of the secondary winding is connected with the drain of the FET 5a. According to the second embodiment, the pulse transformer 8 is arranged between the gas-discharge lamp 12 and the shunt resistance 4, and the start of the primary winding is connected with the drain of the FET 11. Referring to FIG. 4, reference numeral 1 indicates the power supply, 2 indicates the DC/DC converter, 3 indicates the earth, 4 indicates the shunt resistance, 8 indicates is the pulse transformer, and 9 indicates the electrolytic capacitor. 10 indicates the resistor, 11 indicates the FET, 12 indicates the gas-discharge lamp, 13 indicates the I/F, 14 indicates the control circuit. The above-mentioned components are the same as the corresponding components of the first embodiment. The same is true of the detection voltages VL and Vc, and the detection current IL.

Referring to FIG. 4, 201 indicates a diode, 202 indicates a bidirectional two-terminal thyristor (switching element) turned on at 100–200 V, and 203 indicates a resistor of 10–1000 Ω.

In the second embodiment, the power conditioning means comprises the DC/DC converter 2, the I/F 13, and the control circuit 14. The power conditioning means regulates the electric power supplied from the power supply 1. The voltages of mutually different levels are output from the two output terminals of the DC/DC converter 2. The capacitor 2d (first capacitor) is connected between these two output terminals.

Moreover, the switching circuit unit 5' comprises the FET 5a. The source of the FET 5a constitutes the first input terminal and the first output terminal of the switching circuit unit 5'. The drain of the FET 5a constitutes the second input terminal and the second output terminal of the switching circuit unit 5'. The two input terminals of the switching circuit unit 5' are connected with the two output terminals of the DC/DC converter 2 of the power conditioning means.

A difference between the first embodiment and the second embodiment is that the auxiliary start-up circuit 6 and the inductor 7 are eliminated, the diode 201, the bidirectional two-terminal thyristor 202, and the resistor 203 are introduced. The connection of the pulse transformer 8 is also different.

A description will now be given of the connection.

The end of the secondary winding of the pulse transformer 8 is connected with the first electrode of the gas-discharge lamp 12. The node between the start of the secondary winding and the end of the primary winding is connected with the first electrode of the electrolytic capacitor 9. The start of the primary winding of the pulse transformer 8 is connected with the first terminal of the resistor 10, the drain of the FET 11 and the first terminal of the resistor 203.

The second terminal of the resistor 203 is connected with the first electrode of the bidirectional two-terminal thyristor 202, which is the switching element. The second electrode of the bidirectional two-terminal thyristor 202 is connected with the cathode of the diode 201. The anode of the diode 201 is connected with the second electrode of the gas-discharge lamp, the drain of the FET 5a, the cathode of the diode 2C and the first electrode of the capacitor 2d.

The source of the FET 11, the second terminal of the resistor 10, and the second electrode of the electrolytic capacitor 9 are connected with the earth 3 via the shunt resistance 4.

Therefore, the electrolytic capacitor 9 (second capacitor) is placed in a circuit connecting in series the second output terminal of the switching circuit unit 5' and the gas-discharge lamp 12. Moreover, the pulse transformer 8 is connected between the electrolytic capacitor 9 and the gas-discharge lamp 12. The first terminal of the primary winding of the pulse transformer 8 is connected with the first electrode of the electrolytic capacitor 9. The second terminal of the primary winding of the pulse transformer 8 is connected with the second electrode of the electrolytic capacitor 9 via the FET 11, thereby forming a circuit, which charges the electrolytic capacitor 9. Further, the bidirectional two-terminal thyristor 202 is provided in the circuit charging the electrolytic capacitor 9.

The other connections are the same as those of the first embodiment.

A description will now be given of the operation.

Figure 5:
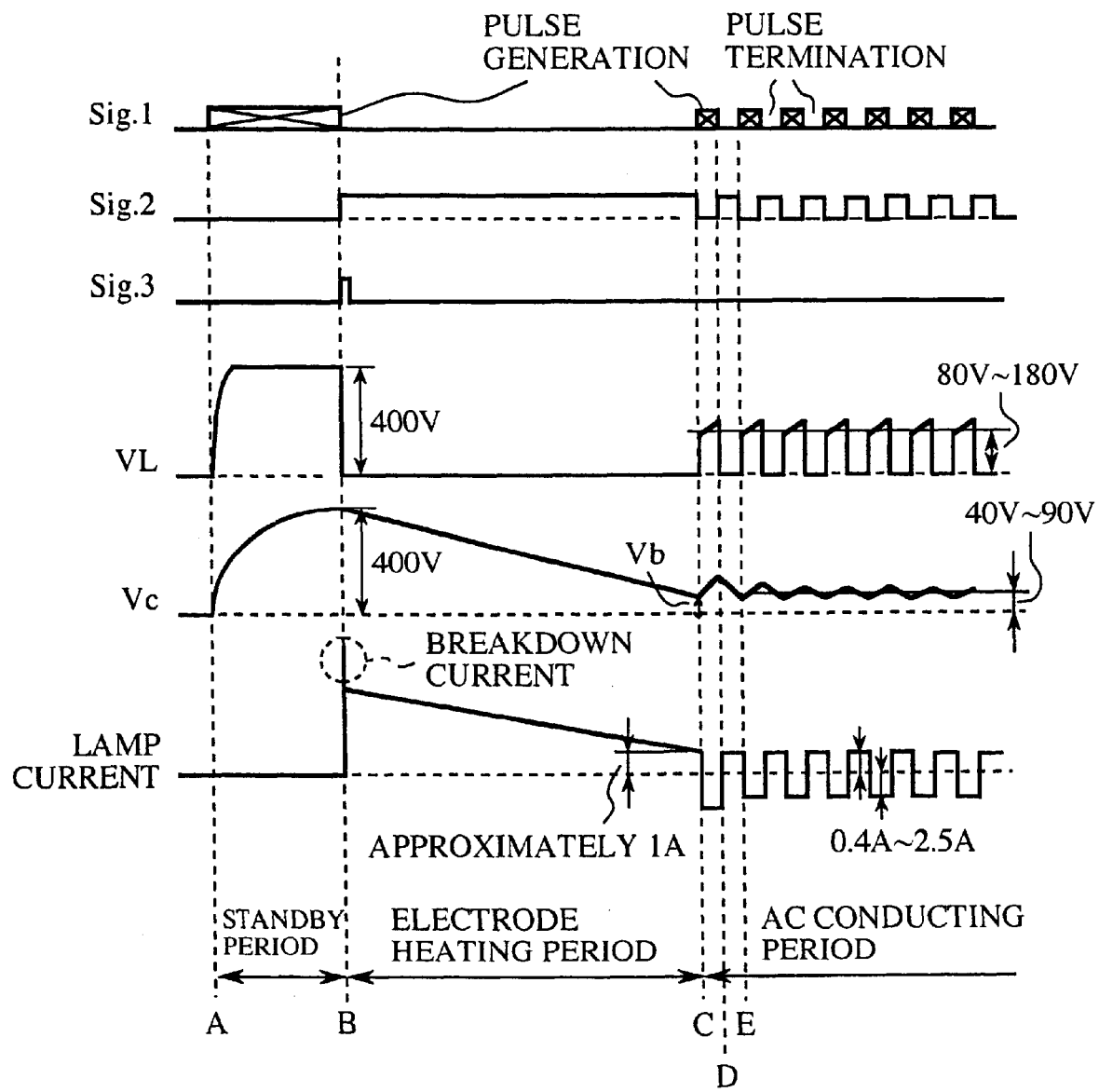
FIG. 5 is a timing chart showing the waveforms of the control signals, and the waveforms of the detected voltages and the current in the gas-discharge lamp.

FIG. 5 is a timing chart showing the waveforms of the control signals Sig.1, Sig.2, and Sig.3, and the waveforms of the voltages VL, Vc, and the current in the gas-discharge lamp.

When the switch of the power supply is turned on, the control signals Sig.2 and Sig.3 go low, causing the FETs 5 and 11 to be turned off. The control signal Sig.1 is generated in the form of a pulse signal of 100 kHz, as in the first embodiment, and is supplied to the gate of the FET 2b (A of FIG. 5). The DC/DC converter 2 is operated by feeding the pulse signal to the FET 2b. With this, the capacitor 2d is charged. When a voltage difference between the capacitor 2d and the electrolytic capacitor 9 develops to 100–200 V, the bidirectional two-terminal thyristor 202 turns on so that the electrolytic capacitor 9 is charged.

The voltage Vc of the electrolytic capacitor 9 increases monotonically. When it is determined that the voltage develops to 400 V (standby period), the control signal Sig.1 is brought to a low level so that the operation of the DC/DC converter 2 is stopped. The control signal Sig.2 is brought to a high level so that the FET 5a is turned on. The control signal Sig.3 is brought to a high level for 100 [nsec]–10 [μsec] so that the FET 11 is turned on (B of FIG. 5). Then, the electric charge of 400 V accumulated in the electrolytic capacitor 9 is drained via the primary winding of the pulse transformer 8 and the FET 11. As a result of this primary current, a high voltage of about 20 kV is generated in the secondary winding of the pulse transformer 8 so that the gas discharge begins. A current of a high peak and a short pulse width (breakdown current) flows in the gas-discharge lamp. Drop of the voltage of the electrolytic capacitor 9 due to the turn-on of the FET 11 is 1–10 mV. Further, when the FET 5a is turned on, the diode 201 prevents a current from flowing in the bidirectional two-terminal thyristor 202. Therefore, the bidirectional two-terminal thyristor 202 is turned off.

At the same time as the voltage in the gas-discharge lamp 12 rapidly drops, the electric charge stored in the electrolytic capacitor 9 flows into the gas-discharge lamp 12 so that the gas discharge is sustained. Thereafter, the gas discharge is maintained (electrode heating period) by the electric charge stored in the electrolytic capacitor 9. The voltage Vc of the electrolytic capacitor 9 drops due to the discharging of the gas-discharge lamp 12. When the voltage Vc reaches a predetermined level (40–90 V), the control signal Sig. 1 is generated in the form of a pulse of 100 kHz. The DC/DC converter 2 is then operated. The AC conducting period is started as a result of the FET 5 being turned off by bringing the control signal Sig.2 to a low level (C of FIG. 5). The FET 11 remains turned off in this state, and the gas discharge energy is supplied from the DC/DC converter 2 to the gas-discharge lamp 12. In a similar configuration to the first embodiment, the electrolytic capacitor 9 is charged via the gas-discharge lamp 12. Further, since the voltage between the electrodes of the gas-discharge lamp 12 does not reach the turn-on voltage of the bidirectional two-terminal thyristor 202 (the voltage in the gas-discharge lamp is 100 V or smaller and the turn-on voltage is 100 V or greater), the charging path to the electrolytic capacitor 9 via the bidirectional two-terminal thyristor 202 is cut off.

When the DC/DC converter 2 supplies the current to the gas-discharge lamp 12 for a predetermined period of time, the control signal Sig.1 is brought to a low level (the pulse is stopped) so that the operation of the DC/DC converter 2 is stopped. The FET 5 is turned on by bringing the control signal Sig.2 to a high level (D of FIG. 5). This time, the current of the inverted polarity is supplied from the electrolytic capacitor 9 to the gas-discharge lamp 12. When the current is supplied from the electrolytic capacitor 9 for a predetermined period of time, the DC/DC converter 2 supplies the current again (E of FIG. 5). The current-feed from the DC/DC converter 2 and the current-feed from the electrolytic capacitor 9 are alternately performed. In a similar configuration to the first embodiment, the cycle period is 200 Hz or greater (AC conducting period). The power loss does not occur since the two bidirectional terminal thyristor 202 is being turned off during the AC conducting period.

In a similar configuration to the first embodiment, by comparing the current output IL, and the voltage outputs VL, Vc with the set value of the control circuit, the power control is performed. When the AC conducting period sets in, the FET 2b of the DC/DC converter 2 is promptly controlled by the control signal Sig.1 to maintain the electric power of 34 W.

In a similar configuration to the first embodiment, in the AC conducting period, the operating period of the DC/DC converter 2 is ensured, in principle, not to concur with the ON period of the FET 5. If the concurrence occurs, a short-circuit current is produced so that the power loss occurs. Further, the FET 5 is turned on after an elapse of 10–1000 μsec after the operation of the DC/DC converter 2 is stopped. The purpose of it is to use the electric charge accumulated in the capacitor 2d to cause the discharge in the gas-discharge lamp. As a result, the power loss due to the electric charge of the capacitor 2d is also reduced.

As described in the first embodiment, the dying out phenomenon of the gas discharge occurs when the polarity is inverted in a transition, occurring as the several pulses are asserted at the beginning of the AC conducting period, from the current-feed by the DC/DC converter 2 to the current-feed by the electrolytic capacitor 9. To prevent this, in the second embodiment, when the polarity is inverted in a transition from the current feed by the DC/DC converter 2 to the current feed by the electrolytic capacitor 9, the voltage generated in the gas-discharge lamp is raised.

Figure 6:
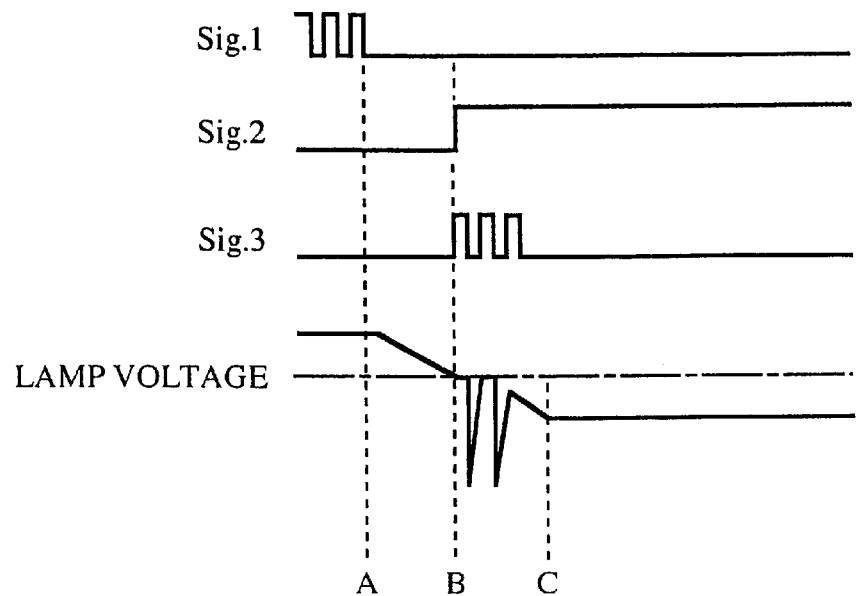
FIG. 6 shows a method of raising the voltage according to the second embodiment.

FIG. 6 shows a method of raising the voltage according to the second embodiment.

FIG. 6 shows the control signals Sig. 1, Sig. 2, Sig. 3 supplied to the FET 2b, 5, 11, respectively, and the voltage between the electrodes of the gas-discharge lamp 12 (gas-discharge lamp voltage) occurring when the operation of the DC/DC converter 12 is stopped and the FET 5a is turned on to invert the discharge polarity of the gas-discharge lamp 12.

A description will now be given of the operation of raising the voltage.

By turning off the FET 2b by bringing the control signal Sig.1 to a low level, the operation of the DC/DC converter 2 is stopped (A of FIG. 6). The voltage in the gas-discharge lamp decreases gradually. When the voltage approaches zero, at the same time as the FET 5 is turned on by bringing the control signal Sig.2 to a high level, the control signal Sig.3 is brought to a high level for only several μsec so that the FET 11 is turned on for only several μsec (B of FIG. 6). Then, a portion of the electric charge stored in the electrolytic capacitor 9 flows to the primary winding of the pulse transformer 8, thus generating the pulse voltage of 200–300 V in the secondary winding. This operation is performed several times, so that the gas discharge is sustained by this high-voltage pulse and the dying out of the gas discharge of the gas-discharge lamp is prevented from occurring at the polarity inversion.

As described above, according to the second embodiment, a current is supplied to the primary winding of the pulse transformer 8 before supplying a current to the gas-discharge lamp 12 from the electrolytic capacitor 9 (second capacitor), and the voltage between the electrodes of the gas-discharge lamp 12 is ensured to be larger than the voltage maintained in the electrolytic capacitor 9. The gas-discharge lamp 12 is AC driven by alternately performing the current-feed from the DC/DC converter 2 of the power conditioning means and the current-feed from the second electrolytic capacitor 9.

The operation of extinguishing the lamp is the same as that of the first embodiment.

The FET 11 of the switching device has been described as being implemented by a MOSFET but a similar effect is provided even if this is replaced with an IGBT. An IGBT is preferable because it can withstand a heavier current.

As described, according to second embodiment, the switching element FET 11 and the electrolytic capacitor 9 perform the function of the related art circuit components in the high-voltage pulse generation circuit unit (igniter circuit unit). Thereby, the number of circuit components is reduced (elimination of circuit components other than the pulse transformer). Moreover, the electrolytic capacitor 9 is assigned the function of the auxiliary start-up circuit 6 of the first embodiment. With this, the auxiliary start-up circuit 6 and the inductor 7 are eliminated.

Thus, the second embodiment ensures that the igniter circuit is composed only of the pulse transformer, the bridge circuit is assigned the function of the switch, and the function of the capacitor for energy supply to the primary winding is covered by the smoothing capacitor at the output of the DC/DC converter. Therefore, of those components necessary for generation of the high-voltage pulse for the discharge starting, the circuit components other than the pulse transformer can be eliminated. Also, the auxiliary start-up circuit 6 and the inductor 7 are not necessary. Thus, the scale and cost of the device can be reduced.

Further, by causing a current to flow in the primary winding of the pulse transformer when the polarity is inverted in a transition from the electrode heating period to the AC conducting period, and when the polarity is inverted in an initial stage of the AC conducting period in a transition to the current feed by the second capacitor to the gas-discharge lamp, a large voltage is developed across the electrodes of the gas-discharge lamp. Accordingly, the dying out phenomenon that occurs when the polarity is inverted in a transition from the electrode heating period to the AC conducting period and during an initial stage of the AC conducting period is eliminated. As a result, an gas-discharge lamp lighting apparatus with an excellent lighting performance is obtained.

Since the electrolytic capacitor 9 has a large capacitance and requires a relatively long period of time for charging, a resistor of a large resistance cannot be introduced in the charging circuit. When a resistor of a small resistance is used, a relatively large power loss occurs due to the small resistance parallel with the gas-discharge lamp, when a current is supplied to the gas-discharge lamp from the DC/DC converter in the AC conducting period. By providing the switching element, it is ensured that the charging circuit is turned off during the AC conducting period, thereby preventing the power loss.

Third Embodiment

Figure 7:
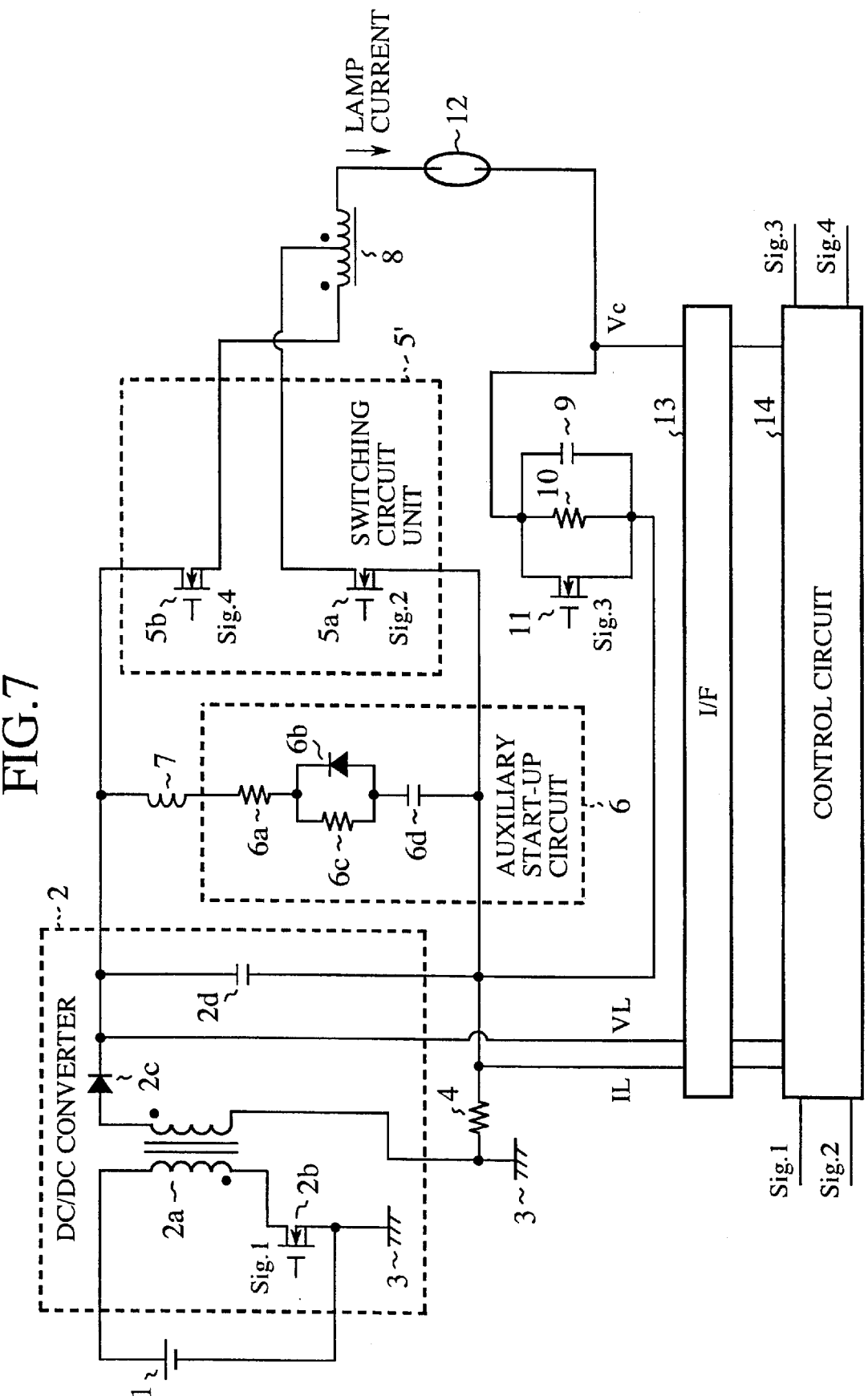
FIG. 7 shows an gas-discharge lamp lighting apparatus according to a third embodiment of the present invention.

FIG. 7 shows an gas-discharge lamp lighting apparatus according to the third embodiment of the present invention. Referring to FIG. 7, reference numeral 1 indicates the power supply, 2 indicates the DC/DC converter, 3 indicates the earth, 4 indicates the shunt resistance, 6 indicates the auxiliary start-up circuit, and 7 indicates the inductor. 8 indicates the pulse transformer, 9 indicates the electrolytic capacitor, 10 indicates the resistor, 11 indicates the FET, 12 indicates the gas-discharge lamp, 13 indicates the I/F, and 14 indicates the control circuit. The aforementioned constituting elements are identical to the corresponding elements of the first embodiment. 5' indicates the switching circuit unit, 5a and 5b indicate the switching elements constituting the switching circuit unit 5' and implemented by FETs.

The power conditioning means is composed of the DC/DC converter 2, the I/F 13, and the control circuit 14 and regulates the electric power supplied from the power supply 1. The voltages at mutually different levels are output from the two output terminals of the DC/DC converter 2. The capacitor 2d (first capacitor) is connected between these two output terminals.

The switching circuit unit 5' is composed of the two FETs 5a and 5b. The drain of this FET 5a forms the first output terminal of the switching circuit unit 5' and the source of the FET 5a forms the first input terminal of the switching circuit unit' 5. The source of the FET 5b forms the second output terminal of the switching circuit unit 5' and the drain of the FET 5b forms the second input terminal of the switching circuit unit 5'. The two input terminals of the switching circuit unit 5' are connected with the two output terminals of the DC/DC converter 2 of the power conditioning means.

The pulse transformer 8, which generates the high-voltage pulse, is placed in a circuit connecting the output terminals of the switching circuit unit 5' with the gas-discharge lamp 12.

In the embodiment 3, the circuit system described in the first embodiment, whereby the parts count in the high-voltage pulse generation circuit is reduced, is applied to an gas-discharge lamp lighting apparatus of a half bridge circuit configuration widely used in the related art.

The switching circuit unit 5' is composed only of the switching element FET 5 in the first embodiment. In contrast, in the third embodiment, the switching circuit unit 5' is composed of the FET 5a and the FET 5b. Moreover, the connection is slightly different.

A description will now be given of how the connection according to the third embodiment is different from that of the first embodiment.

The first electrode of the smoothing capacitor 2d is connected with the earth 3 via the shunt resistance 4 (the same arrangement as the first embodiment), and the second electrode of the smoothing capacitor 2d is connected with the start of the primary winding of the pulse transformer 8 via the FET 5b. The cathode of the diode 2c and the first terminal of the inductor 7 are connected with the drain of the FET 5b. The second terminal of the inductor 7 is connected with the resistor 6a of the auxiliary start-up circuit 6.

The end of the primary winding of the pulse transformer 8 (the first terminal) is connected with the first terminal of the DC/DC converter 2 of the power conditioning means via the first output terminal of the switching circuit unit 5', and the start of the primary winding (the other terminal) is connected with the second output terminal of the DC/DC converter 2 of the power conditioning means via the switching circuit unit 5'. That is, the end of the primary winding of the pulse transformer 8 (the first terminal) is connected with the first output terminal of the DC/DC converter 2 of the power conditioning means via the FET 5a. The start of the primary winding (the first terminal) is connected with the second output terminal of the DC/DC converter 2 of the power conditioning means via the FET 5b.

The connection of the FET 5a is the same as that of the first embodiment. The control circuit 14 supplies the control signal Sig.2 to the gate of the FET 5a and also supplies the control signal Sig.4 to the gate of the FET 5b.

In a similar configuration to the first embodiment, the electrolytic capacitor 9, the second capacitor connected in series with the gas-discharge lamp 12, is placed in a circuit which connects the pulse transformer 8, the gas-discharge lamp 12, and the first output terminal of the DC/DC converter 2 of the power conditioning means. Further, the FET 11 is placed in parallel with the electrolytic capacitor 9.

A description is omitted about the initial current feed means of the third embodiment since it is similar to that of the first embodiment.

A description will now be given of the operation.

Figure 8:
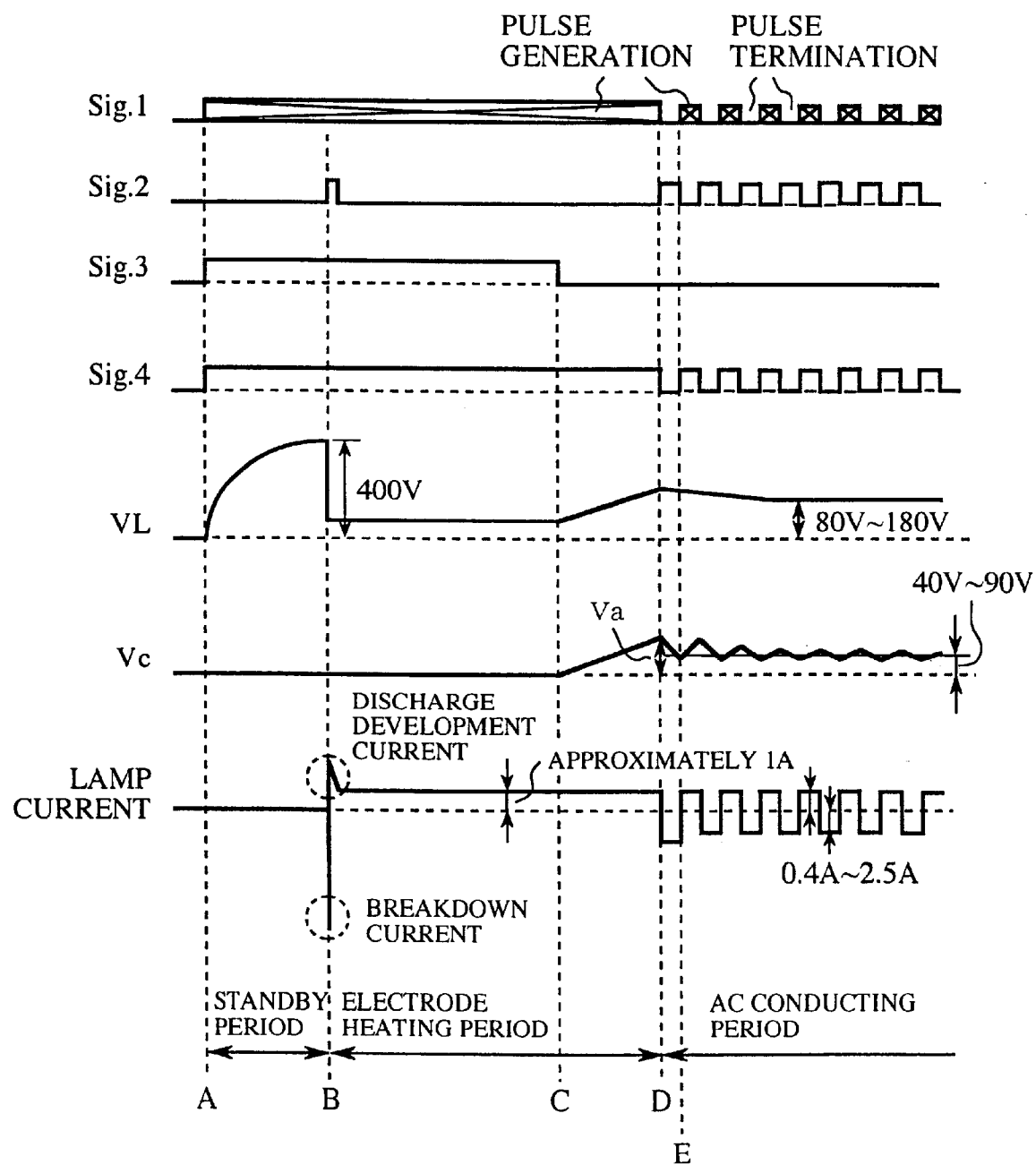
FIG. 8 is a timing chart showing the waveform of the control signals, and the waveforms of the detected voltages and the current in the gas-discharge lamp.

FIG. 8 is a timing chart showing the waveform of the control signals Sig.1, Sig.2, and Sig.3, and the waveforms of the voltages VL, Vc, and the current in the gas-discharge lamp. The only difference from FIG. 2 described in the first embodiment is that the control signal Sig.4 is introduced, the other aspects remaining the same. In the third embodiment, the FET 5b is turned on and off depending on the operation of the DC/DC converter 2. Accordingly, the operation according to the third embodiment is the same as that of the first embodiment.

In the third embodiment, as well as in the first embodiment, the voltage occurring in the gas-discharge lamp 12 is raised when the polarity is inverted in a transition from the electrode heating period to the AC conducting period and when the polarity is inverted in an initial stage of the AC conducting period in which the current-feed by the DC/DC converter 2 is switched to the current-feed by the electrolytic capacitor 9, thereby preventing the dying out of the gas discharge from occurring.

A large current, which flows in the primary winding of the pulse transformer at the discharge starting is supplied via the FET 5b and FET 5a. Therefore, as disclosed in the first and second embodiments, the FETs 5b and 5a are preferably an IGBT.

Thus, the third embodiment ensures that the igniter circuit is composed only of the pulse transformer, the bridge circuit is assigned the function of the switch, and the function of the capacitor for energy supply to the primary winding is covered by the smoothing capacitor at the output of the DC/DC converter. Therefore, of those components necessary for generation of the high-voltage pulse for the discharge starting, the circuit components other than the pulse transformer can be eliminated. Thus, the scale and cost of the apparatus can be reduced.

Further, since the magnitude of energy supplied to the gas-discharge lamp continuously in the electrode heating period is optimized by providing the switching element in parallel with the second capacitor, the subsequent gas discharge is easily sustained.

By causing a current to flow in the primary winding of the pulse transformer when the polarity is inverted in a transition from the electrode heating period to the AC conducting period, and when the polarity is inverted in an initial stage of the AC conducting period marked by the current feed by the second capacitor to the gas-discharge lamp, a large voltage is developed across the electrodes of the gas-discharge lamp. Accordingly, the dying out phenomenon that occurs when the polarity is inverted in a transition from the electrode heating period to the AC conducting period and during an initial stage of the AC conducting period is eliminated. As a result, an gas-discharge lamp lighting apparatus with an excellent lighting performance is obtained.

Further, since it is ensured that a sufficient discharge development current is supplied to the gas-discharge lamp, the dying out of the gas discharge is prevented from occurring immediately after the discharge starting.

Fourth Embodiment

Figure 9:
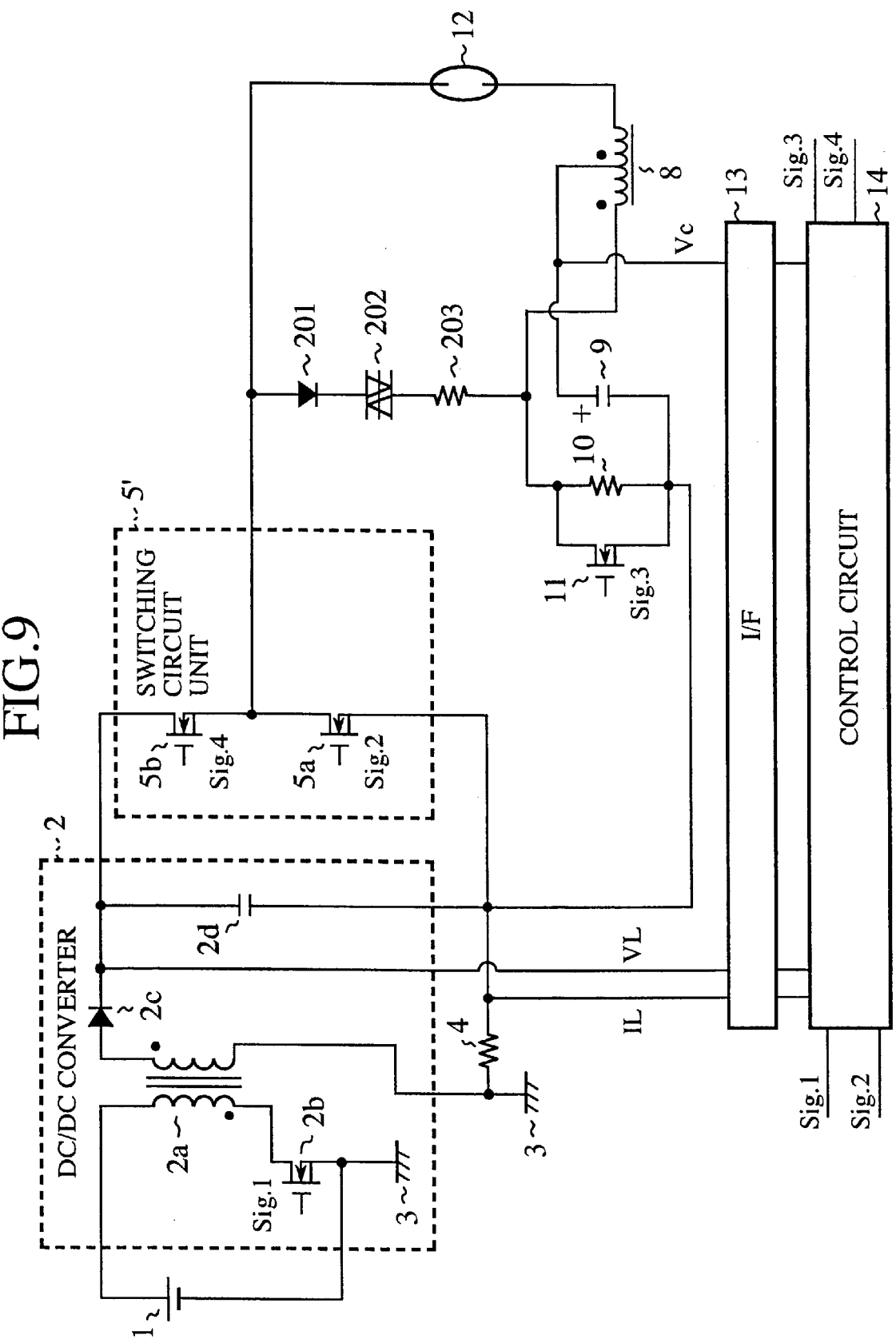
FIG. 9 shows an gas-discharge lamp lighting apparatus according to a fourth embodiment of the present invention.

FIG. 9 shows an gas-discharge lamp lighting apparatus according to the fourth embodiment of the present invention. Referring to FIG. 9, reference numeral 1 indicates the power supply, 2 indicates the DC/DC converter, 3 indicates the earth, 4 indicates the shunt resistance. 8 indicates is the pulse transformer, 9 indicates the electrolytic capacitor, 10 indicates the resistance, 11 indicates the FET, 12 indicates the gas-discharge lamp, 13 indicates the I/F, and 14 indicates the control circuit. 201 indicates the diode, 202 indicates the bidirectional two-terminal thyristor and 203 indicates the resistor. The aforementioned constituting elements are identical to the corresponding elements of the second embodiment. 5' indicates the switching circuit unit, 5a and 5b indicate the switching elements constituting the switching circuit unit 5' and implemented by FETs.

According to the fourth embodiment, the power conditioning means is composed of the DC/DC converter 2, the I/F 13, and the control circuit 14 and regulates the electric power supplied from the power supply 1. The voltages with mutually different levels are output from the two output terminals of the DC/DC converter 2. The capacitor 2d, the first capacitor, is connected between these two output terminals.

Further, the switching circuit unit 5' is composed of the two FETs 5a and 5b. The source of this FET 5a forms the first input terminal and the first output terminal of the switching circuit unit 5', and the drain of the FET 5a forms the second output terminal of the switching circuit unit' 5, by being connected with the source of the FET 5b. The drain of the FET 5b forms the second input terminal of the switching circuit unit 5'. The two input terminals of the switching circuit unit 5' are connected with the two output terminals of the DC/DC converter 2 of the power conditioning means.

In the fourth embodiment, the circuit system described in the second embodiment, whereby the parts count in the high-voltage pulse generation circuit unit is reduced, is applied to an gas-discharge lamp lighting apparatus of a half bridge circuit configuration widely used in the related art.

The switching circuit unit 5' is composed only of the switching element FET 5 in the second embodiment. In contrast, in the fourth embodiment, the switching circuit unit 5' is composed of the FET 5a and the FET 5b. Further, the connection is slightly different.

A description will now be given of how the connection according to the fourth embodiment is different from that of the second embodiment.

The first electrode of the smoothing capacitor 2d is connected with the earth 3 via the shunt resistance 4 (the same arrangement as the second embodiment), and the second electrode of the smoothing capacitor 2d is connected with the drain of the FET 5b. The source of the FET 5b is connected with the drain of the FET 5a, the anode of the diode 201 and the gas-discharge lamp 12. The source of the FET 5a is connected with the earth 3 via the shunt resistance 4. The control circuit 14 supplies the control signal Sig.2 to the gate of the FET 5a and also supplies the control signal Sig.4 to the gate of the FET 5b.

A description will now be given of the operation.

Figure 10:
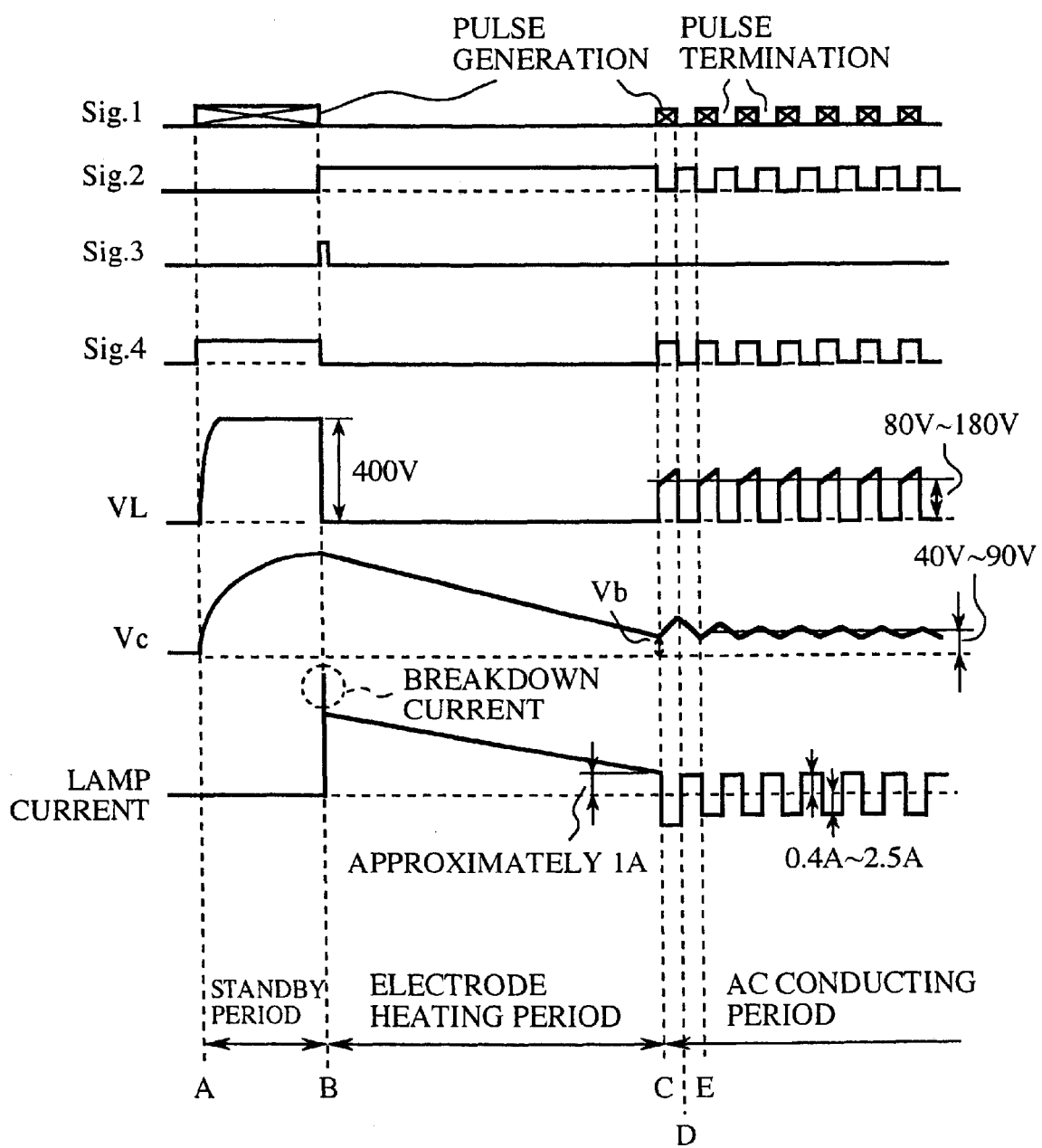
FIG. 10 is a timing chart showing the waveforms of the control signals, and the waveforms of the detected voltages, and the current in the gas-discharge lamp.

FIG. 10 is a timing chart showing the waveforms of the control signals Sig.1, Sig.2, and Sig.3, and the waveforms of the voltages VL, Vc, and the current in the gas-discharge lamp. The only difference from FIG. 5 described in the second embodiment is that the control signal Sig.4 is introduced, the other aspects remaining the same. In the fourth embodiment, the FET 5b is turned on and off depending on the operation of the DC/DC converter 2. Accordingly, the operation according to the fourth embodiment is identical to that of the second embodiment.

In the fourth embodiment, as well as in the second embodiment, the voltage occurring in the gas-discharge lamp 12 is raised when the polarity is inverted in a transition from the electrode heating period to the AC conducting period and when the polarity is inverted in an initial stage of the AC conducting period in which the current-feed by the DC/DC converter 2 is switched to the current-feed by the electrolytic capacitor 9, thereby preventing the dying out of the gas discharge is prevented from occurring.

A large current, which flows in the primary winding of the pulse transformer at the discharge starting is supplied via the FET 5b and FET 5a. As disclosed in the first through third embodiments, the FETs 5b and 5a are preferably an IGBT.

Thus, the fourth embodiment ensures that the igniter circuit is composed only of the pulse transformer, the bridge circuit is assigned the function of the switch, and the function of the capacitor for energy supply to the primary winding is covered by the smoothing capacitor at the output of the DC/DC converter. Therefore, of those components necessary for generation of the high-voltage pulse for the discharge starting, the circuit components other than the pulse transformer can be eliminated. Also, the auxiliary start-up circuit 6 and the inductor 7 are not necessary. Thus, the scale and cost of the device can be reduced.

By causing a current to flow in the primary winding of the pulse transformer when the polarity is inverted in a transition from the electrode heating period to the AC conducting period, and when the polarity is inverted in an initial stage of the AC conducting period marked by the current feed by the second capacitor to the gas-discharge lamp, a large voltage is developed across the electrodes of the gas-discharge lamp. Accordingly, the dying out phenomenon that occurs when the polarity is inverted in a transition from the electrode heating period to the AC conducting period and during an initial stage of the AC conducting period is eliminated. As a result, an gas-discharge lamp lighting apparatus with an excellent lighting performance is obtained.

Since the electrolytic capacitor 9 has a large capacitance and requires a relatively long period of time for charging, a resistor of a large resistance cannot be introduced in the charging circuit. When a resistor of a small resistance is used, a relatively large power loss occurs due to the small resistance parallel with the gas-discharge lamp, when a current is supplied to the gas-discharge lamp from the DC/DC converter in the AC conducting period. By providing the switching element, it is ensured that the charging circuit is turned off during the AC conducting period, thereby preventing the power loss.

Fifth Embodiment

Figure 11:
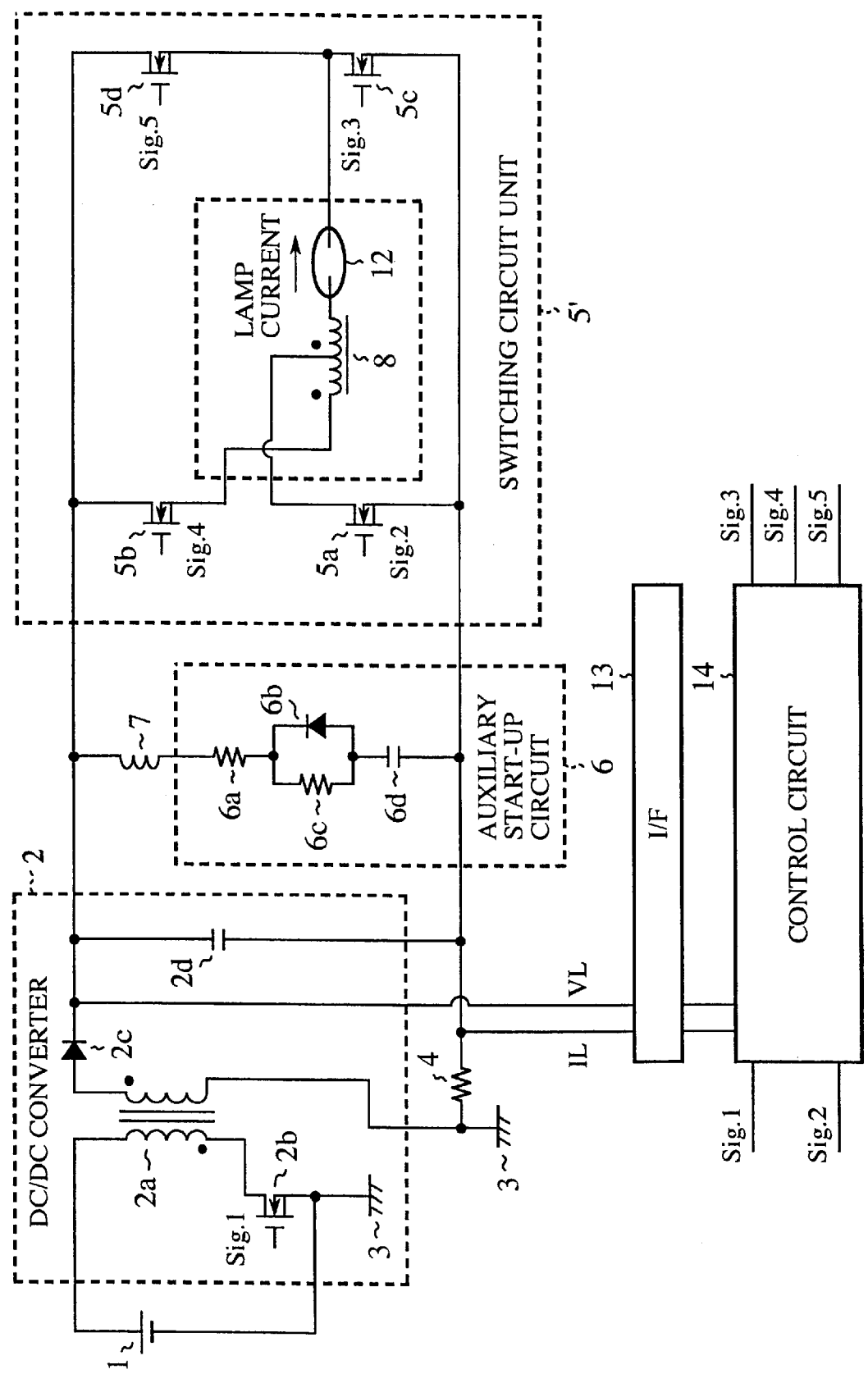
FIG. 11 shows an gas-discharge lamp lighting apparatus according to a fifth embodiment of the present invention.

FIG. 11 shows an gas-discharge lamp lighting apparatus according to the fifth embodiment of the present invention. Referring to FIG. 11, reference numeral 1 indicates the power supply, 2 indicates the DC/DC converter, 3 indicates the earth, 4 indicates the shunt resistance. 6 indicates the auxiliary start-up circuit, 7 indicates the inductor, and 8 indicates the pulse transformer, 12 indicates the gas-discharge lamp, 13 indicates the I/F, and 14 indicates the control circuit. The aforementioned constituting elements are identical to the corresponding elements of the first and second embodiments. 5' indicates the switching circuit unit, 5a, 5b, 5c and 5d indicate the switching elements constituting the switching circuit unit 5' and implemented by FETs.

According to the fifth embodiment, the power conditioning means is composed of the DC/DC converter 2, the I/F 13, and the control circuit 14 and regulates the electric power supplied from the power supply 1. The voltages with mutually different levels are output from the two output terminals of the DC/DC converter 2. The capacitor 2d, the first capacitor, is connected between these two output terminals.

Further, the switching circuit unit 5' is composed of the four FETs 5a, 5b, 5c and 5d. The FETs 5a, 5b, 5c and 5d form a full bridge inverter circuit converting the dc output voltage of the DC/DC converter 2 of the power conditioning means into the ac voltage.

The FETs 5a and 5b form an arm of the switching circuit unit 5, and the FETs 5c and 5d form the other arm of the switching circuit unit 5'.

The drain of the FET 5a constitutes the first output terminal of the switching circuit unit 5', and the source of the FET 5a constitutes the first input terminal of the switching circuit unit 5'. The source of the FET 5b constitutes the second output terminal of the switching circuit unit 5', and the drain of the FET 5b constitutes the second input terminal of the switching circuit unit 5'.

The drain of the FET 5c is connected with the source of the FET 5d and constitutes the third output terminal of the switching circuit unit 5'. The source of the FET 5c is connected with the source of the FET 5a. The drain of the FET 5d is connected with the drain of the FET 5b.

The two input terminals of the switching circuit unit 5' are connected with the two output terminals of the DC/DC converter 2 of the power conditioning means.

Pulse transformer 8, which generates the high-voltage pulse, is placed in a circuit connecting the output terminals of the switching circuit unit 5' the gas-discharge lamp 12.

In the fifth embodiment, the circuit system described in the first and third embodiment, whereby the parts count in the high-voltage pulse generation circuit unit is reduced, is applied to an gas-discharge lamp lighting apparatus of a full bridge circuit configuration widely used in the related art.

In the fifth embodiment, the electrolytic capacitor 9, the resistance 10, and the FET 11 are eliminated from the configuration of the first embodiment. The switching circuit unit 5' composed of the four elements (FETs 5a, 5b, 5c and 5d) is introduced.

A description will now be given of the connection according to the fifth embodiment by comparing it with that of the third embodiment FIG. 7).

Those aspects of the circuit connection other than the connection involving the FETs 5c and 5d and the gas-discharge lamp 12 remain unchanged. The first electrode of the gas-discharge lamp 12 connected to the electrolytic capacitor 9 is connected to the source of the FET 5d and to the drain of the FET 5c. The drain of the FET 5d is connected to the drain of the cathode of the diode 2c, the smoothing capacitor 2d, the inductor 7, and the FET 5b. The source of the FET 5c is connected with the source of the FET 5a, the capacitor 6d, and the smoothing capacitor 2d. The source of the FET 5c is also connected with the earth 3 via the shunt resistance 4. The control circuit 14 supplies the control signal Sig. 2 to the gate of the FET 5a, the control signal Sig. 4 to the gate of the FET 5b, the control signal Sig. 3 to the gate of the FET 5c, and the control signal Sig. 5 to the gate of the FET 5d.

The first terminal of the primary winding of the pulse transformer 8 is connected with the first output terminal of the DC/DC converter 2 of the power conditioning means via the first output terminal of the switching circuit unit 5'. The second terminal of the primary winding of the pulse transformer 8 is connected with the second output terminal of the DC/DC converter 2 of the power conditioning means via the second output terminal of the switching circuit unit 5'. That is, the second terminal of the primary winding of the pulse transformer 8 is connected with the drain of FET 5a (switching element) constituting an arm of the switching circuit unit 5'. The second terminal of the primary winding of the pulse transformer 8 is connected with the source of other switching element FET 5b.

A description is omitted about the initial current feed means of the fifth embodiment since it is similar to that of the first embodiment.

A description will now be given of the operation.

Figure 12:
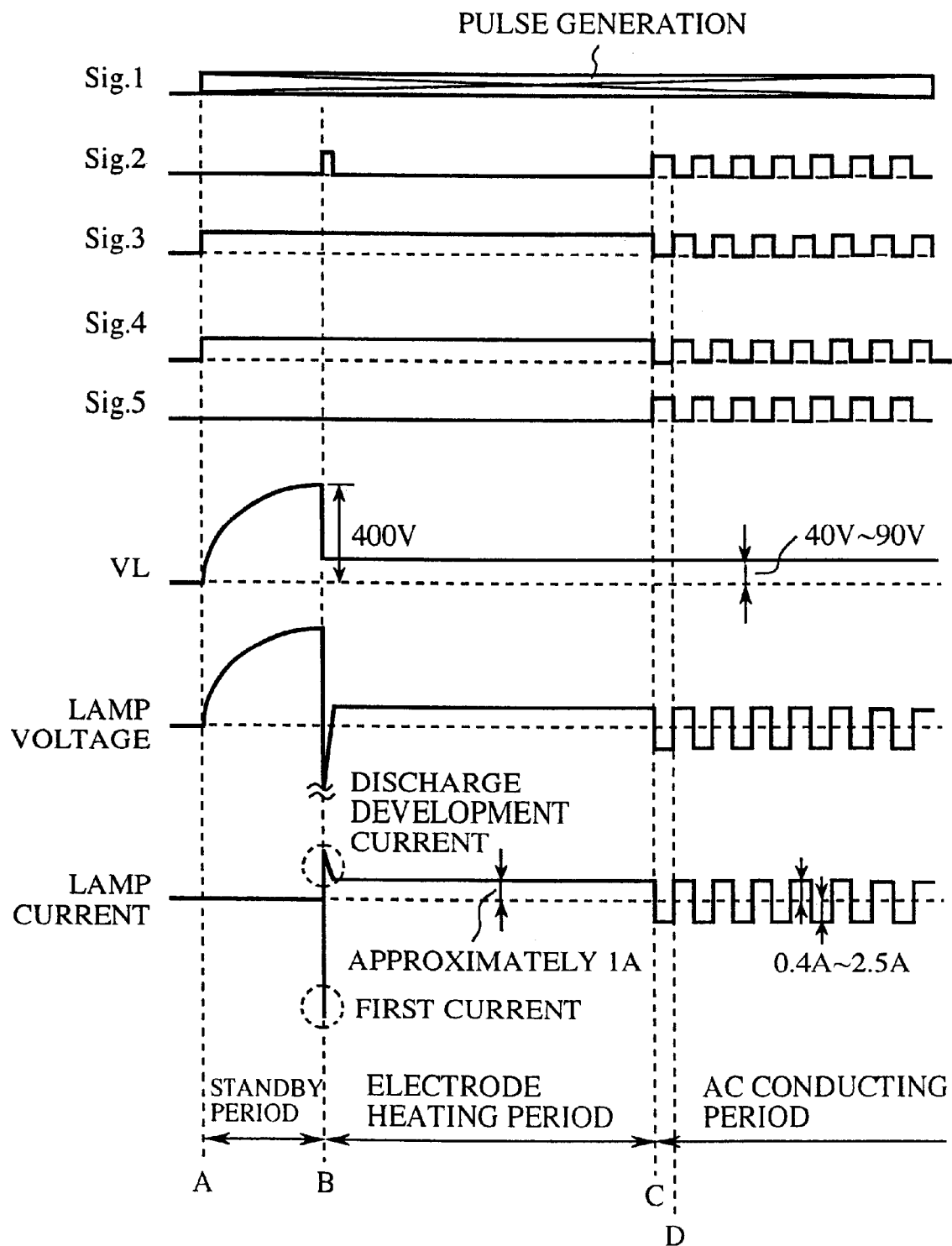
FIG. 12 is a timing chart showing the waveforms of the control signals, and the waveforms of the detected voltages and the current in the gas-discharge lamp.

FIG. 12 is a timing chart showing the waveforms of the control signals Sig.1–Sig.5, and the waveforms of the voltage VL and the current in the gas-discharge lamp. When the switch of the power supply is turned on, the control signals Sig.2 and Sig.5 go low, and the control signals Sig.3 and Sig.4 go high. The FETs 5a and 5d are turned off, and the FETs 5b and 5c are turned on (A of FIG. 12). The control signal Sig.1 is a pulse signal of 100 kHz. The pulse signal is controlled while comparing the voltage VL with a preset voltage value. The voltage VL rises monotonically to 400 V by controlling the gate of the FET 2b of the DC/DC converter 2, thereby charging the capacitors 2d and 6d (standby period).

In the standby period, the control circuit 14 controls the control signal Sig.1 supplied to the gate of the FET 2b so that the voltage of 400 V is developed across the capacitor 2d and capacitor 6d. When it is determined that the voltages across the capacitors 2d and 6d reach 400 V, the control signal Sig. 2 supplied to the gate of the FET 5a is brought to a high level for 100 nsec–10 µsec so that the FET 5a is turned on (B of FIG. 12). Then, the electric charge of 400V accumulated in the capacitor 2d is drained via the FET 5b, the primary winding the pulse transformer 8 and the FET 5a, causing a primary current to flow. The primary current causes a high voltage of about 20 kV to develop in the secondary winding of the pulse transformer so that the discharge is started. At the same time as the voltage across the gas-discharge lamp 12 rapidly decreases, the electric charge, stored in the capacitor 6d of the auxiliary start-up circuit 6 of the DC/DC converter 2, flows into the gas-discharge lamp 12, so that the gas discharge is sustained (discharge development current). Thereafter, the current of about 1A continues to be supplied to the gas-discharge lamp 12 by the DC/DC converter 2. In a similar configuration to the first and second embodiments, the inductor 7 prevents the loss of energy stored in the capacitor 6d caused by turning on the FET 5a for several microseconds for the discharge starting.

When a prescribed quantity of charge is thrown into the gas-discharge lamp 12 (when a prescribed energy is supplied to the gas-discharge lamp) (electrode heating period), the control signals Sig.3 and Sig.4 are brought to a low level, the control signals Sig.2 and Sig.5 are brought to a high level, the FETs 5b and 5c are turned off, and the FETs 5a and 5d are turned on (C of FIG. 12). The current of the inverted polarity is supplied from the DC/DC converter 2 to the gas-discharge lamp 12. When the current is supplied to the gas-discharge lamp 12 for a certain period of time, the control signals Sig.3 and Sig.4 are brought to a high level again, the control signals Sig.2 and Sig.5 are brought to a low level, so that the FETs 5b and 5c are turned on, and the FETs 5a and 5d are turned off (D of FIG. 12). The current of the opposite direction flows in the gas-discharge lamp 12. The cycle period is 200 Hz or longer (AC conducting period). By comparing the current output IL, the voltage output VL with set values of the control circuit, the power control is performed. When the AC conducting period sets in, the FET 2b of the DC/DC converter 2 is promptly controlled by the control signal Sig.1 to maintain the electric power of 34 W.

According to the fifth embodiment, the DC/DC converter 2 is operated in the respective periods.

A large current, which flows in the primary winding of the pulse transformer 8 at the discharge starting, is supplied via the FETs 5b and 5a. As disclosed in the first through fourth embodiments, the FETs 5b and 5a are preferably an IGBT.

Thus, the fifth embodiment ensures that the igniter circuit is composed only of the pulse transformer, the bridge circuit is assigned the function of the switch, and the function of the capacitor for energy supply to the primary winding is covered by the smoothing capacitor at the output of the DC/DC converter. Therefore, of those components necessary for generation of the high-voltage pulse for the discharge starting, the circuit components other than the pulse transformer can be eliminated. Thus, the scale and cost of the device can be reduced.

Further, by causing a sufficient discharge development current to flow in the gas-discharge lamp, the dying out of the discharge is prevented from occurring immediately after the discharge starting.

Sixth Embodiment

Figure 13:
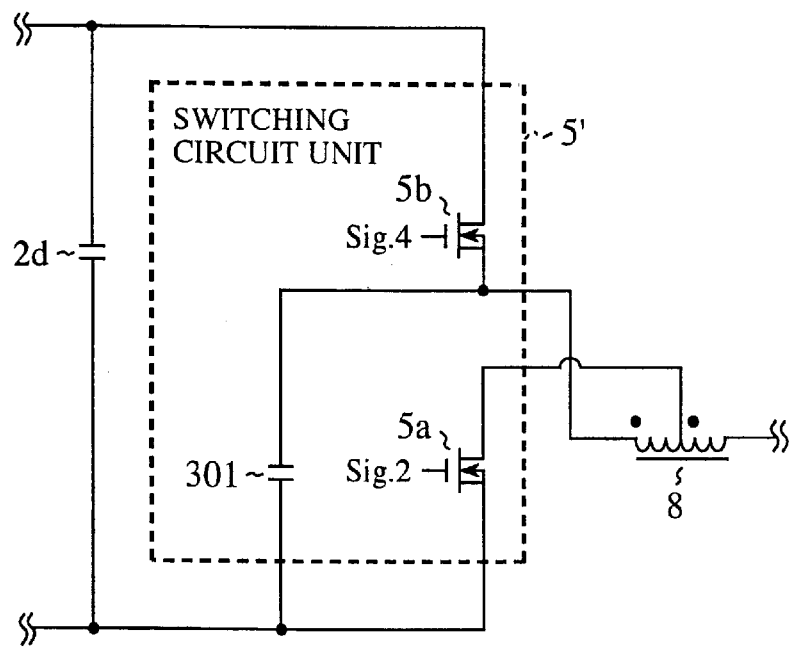
FIG. 13 shows a switching circuit unit of the gas-discharge lamp lighting apparatus according to a sixth embodiment of the present invention.

FIG. 13 shows the switching circuit unit 5' of the gas-discharge lamp lighting apparatus according to the sixth embodiment of the present invention. Referring to FIG. 13, reference numeral 301 indicates a capacitor (third capacitor) which serves as a current-feed source at the discharge starting. The other components of the switching circuit unit 5' are identical to the corresponding components of the third embodiment shown in FIG. 7.

A description will now be given of the connection.

The first electrode of the capacitor 301 of FIG. 13 is connected with the source of the FET 5b and also connected with the start of the primary winding of the pulse transformer 8. The second electrode of capacitor 301 is connected with the source of the FET 5a and also connected with the earth via the shunt resistance 4 (FIG. 7). The capacitor 301 is connected between a) a node, connected to the FET 5b (switching element) connected to the second output terminal of the DC/DC converter 2 of the power conditioning means and to the primary winding of pulse transformer 8, and b) the first output terminal of the DC/DC converter 2 of the power conditioning means.

In a similar configuration to the third embodiment, the drain of the FET 5a is connected with the point of contact with the end of the primary winding of the pulse transformer 8 and the start of the secondary winding.

A description will now be given of the operation.

Since the half bridge circuit described in the third embodiment requires that the FETs 5b and 5a be turned on at the same time in order to start the gas discharge, it is necessary to supply relatively large pulses to both FETs. As shown in FIG. 13, in the sixth embodiment, the capacitor 301, which serves as a current-feed source at the discharge starting, is placed between the source of the FET 5b and the source of the FET 5a. With this, since the current at the discharge starting is supplied from the capacitor 301 to the primary winding of the pulse transformer by turning on the FETS 5a, the FET 5b may be turned off while the current at this discharge starting is supplied. Since the capacitor 301 supplies the current at the discharge starting, the electric charge stored in the smoothing capacitor 2d can be used to supply the discharge development current. The auxiliary start-up circuit 6 and the inductor 7 used to supply the discharge development current in the third embodiment need not be used. By adopting such a circuit configuration, the FET 5b need not be turned on at the discharge starting, the current-feeding capability of the FET 5b may be lowered, and the number of circuit components can be reduced.

Thus, the sixth embodiment ensures that the igniter circuit is composed only of the pulse transformer, the bridge circuit is assigned the function of the switch, and the function of the capacitor for energy supply to the primary winding is covered by the smoothing capacitor at the output of the DC/DC converter. Therefore, of those components necessary for generation of the high-voltage pulse for the discharge starting, the circuit components other than the pulse transformer can be eliminated. Thus, the scale and cost of the device can be reduced.

Moreover, since the magnitude of energy to be supplied to the gas-discharge lamp continuously in the electrode heating period is optimized by providing the switching element in parallel with the second capacitor, the subsequent gas discharge is easily sustained.

Further, a small low-cost circuit element of a small rated current can be used to implement the switching element arranged on the high-voltage side because the circuit configuration in which the switching element arranged on the high-voltage side need not be turned on at the discharge starting is employed. Another benefit is that the auxiliary start-up circuit 6 and the inductor 7 can be eliminated.

By causing a current to flow in the primary winding of the pulse transformer when the polarity is inverted in a transition from the electrode heating period to the AC conducting period, and when the polarity is inverted in an initial stage of the AC conducting period marked by the current feed by the second capacitor to the gas-discharge lamp, a large voltage is developed across the electrodes of the gas-discharge lamp. Accordingly, the dying out phenomenon that occurs when the polarity is inverted in a transition from the electrode heating period to the AC conducting period and during an initial stage of the AC conducting period is eliminated. As a result, an gas-discharge lamp lighting apparatus with an excellent lighting performance is obtained.

Seventh Embodiment

Figure 14:
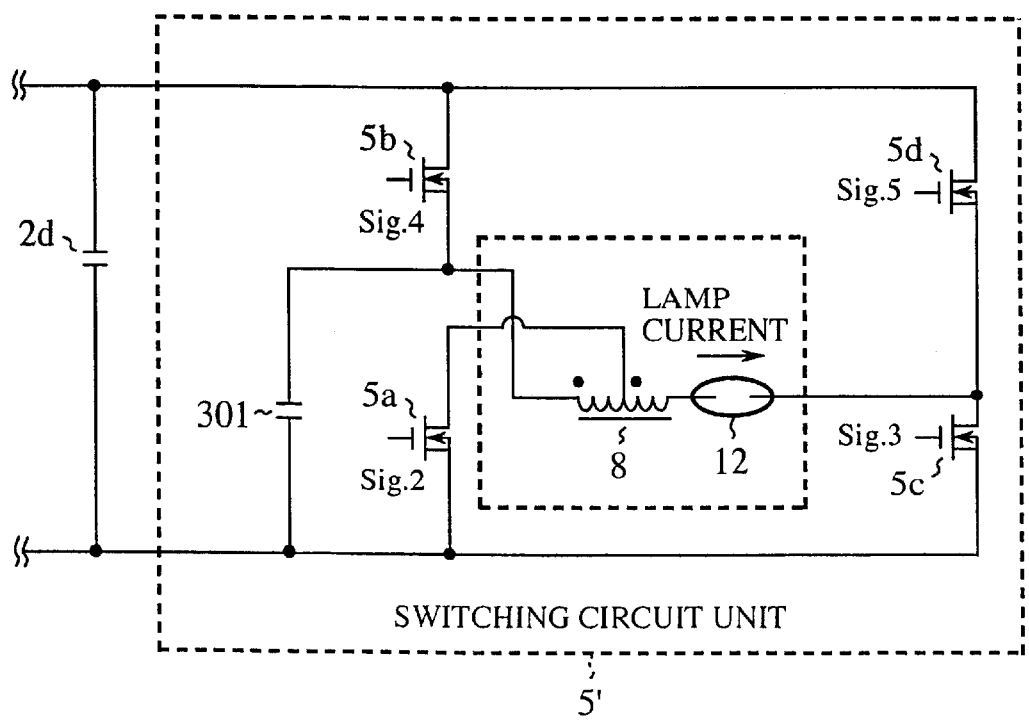
FIG. 14 shows the switching circuit unit 5' of the gas-discharge lamp lighting apparatus according to a seventh embodiment of the present invention.

FIG. 14 shows the switching circuit unit 5' of the gas-discharge lamp lighting apparatus according to the seventh embodiment of the present invention. Referring to FIG. 14, reference numeral 301 indicates a capacitor (third capacitor) which serves as a current-feed source at the discharge starting. The other components of the switching circuit unit 5' are identical to the corresponding components of the fifth embodiment shown in FIG. 11.

A description will now be given of the connection.

The first electrode of the capacitor 301 of FIG. 14 is connected with the source of the FET 5b and also connected with the start of the primary winding of the pulse transformer 8. The second electrode of the capacitor 301 is connected with the source of the FET 5a and also connected with the earth via the shunt resistance 4 (FIG. 11). The capacitor 301 is connected between a) a node, connected to the FET 5b (switching element) connected to the second output terminal of the DC/DC converter 2 of the power conditioning means and to the primary winding of pulse transformer 8, and b) the second output terminal of the DC/DC converter 2 of the power conditioning means.

In a similar configuration to the fifth embodiment, the drain of the FET 5a is connected with the point of contact with the end of the primary winding and the start of the secondary winding of the pulse transformer 8.

The seventh embodiment is constructed such that the circuit system according to the sixth embodiment is applied to the full bridge circuit of the fifth embodiment.

A description will now be given of the operation.

Since the half bridge circuit described in the fifth embodiment requires that the FETs 5b and 5a be turned on at the same time in order to start the gas discharge, it is necessary to supply relatively large pulses to both FETs. As shown in FIG. 14, in the seventh embodiment, the capacitor 301, which serves as a current-feed source at the discharge starting, is placed between the source of the FET 5b and the source of the FET 5a. With this, since the current at the discharge starting is supplied from the capacitor 301 to the primary winding of the pulse transformer by turning on the FETS 5a, the FET 5b can be turned off while the current at this discharge starting is supplied. Since the capacitor 301 supplies the current at the discharge starting, the electric charge stored in the smoothing capacitor 2d can be used to supply the discharge development current. The auxiliary start-up circuit 6 and the inductor 7 used to supply the discharge development current in the fifth embodiment need not be used. By adopting such a circuit configuration, the FET 5b need not be turned on at the discharge starting, the current-feeding capability of the FET 5b may be lowered, and the number of circuit components can be reduced.

Thus, the seventh embodiment ensures that the igniter circuit is composed only of the pulse transformer, the bridge circuit is assigned the function of the switch, and the function of the capacitor for energy supply to the primary winding is covered by the smoothing capacitor at the output of the DC/DC converter. Therefore, of those components necessary for generation of the high-voltage pulse for the discharge starting, the circuit components other than the pulse transformer can be eliminated. Thus, the scale and cost of the device can be reduced.

Moreover, a small low-cost circuit element of a small rated current can be used to implement the switching element arranged on the high-voltage side of the gas-discharge lamp 12 coupled to the pulse transformer 8. This is because the circuit configuration in which the switching element arranged on the high-voltage side need not be turned on at the discharge starting is employed. Another benefit is that the auxiliary start-up circuit 6 and the inductor 7 can be eliminated.

Eighth Embodiment

Figure 15:
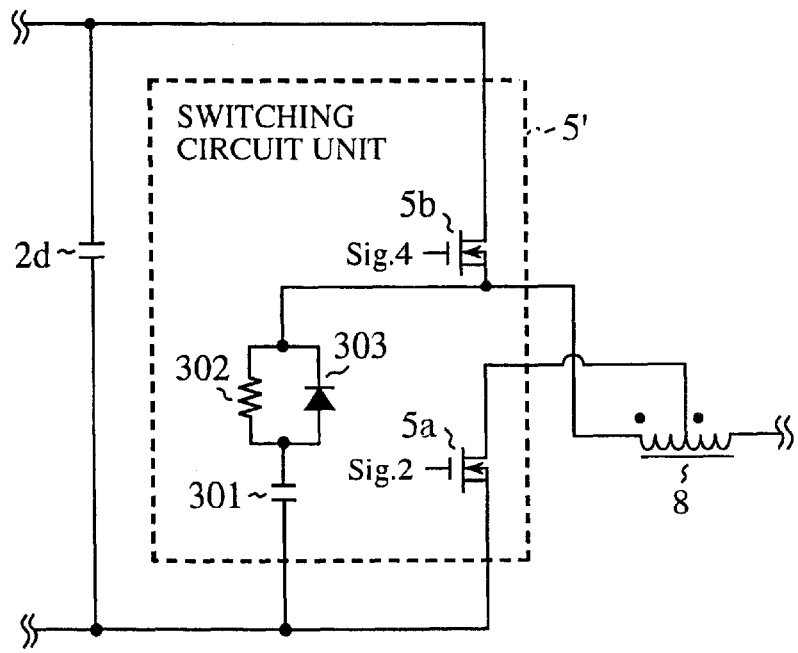
FIG. 15 shows a switching circuit unit of the gas-discharge lamp lighting apparatus according to an eighth embodiment of the present invention.

FIG. 15 shows the switching circuit unit 5' of the gas-discharge lamp lighting apparatus according to the eighth embodiment of the present invention. Referring to FIG. 5, reference numeral 302 indicates a resistor, and 303 indicates a diode. The other constituting elements are identical to the corresponding elements of the sixth embodiment shown in FIG. 13.

In the sixth embodiment, every time the FETs 5a is turned on by switching during the AC conducting period, the electric charge of the capacitor 301 drains as a current in a closed circuit, the closed circuit being formed while the FET 5a is being turned on by capacitor 301-primary winding of the pulse transformer 8-FET 5a-capacitor 301. The power is consumed by the ON resistance of the FET 5a, producing the power loss. To prevent the power loss, the eighth embodiment employs a configuration as shown in FIG. 15.

A description will now be given of the connection.

In a similar configuration to the sixth embodiment, the first electrode of the capacitor 301 is connected with the source of the FET 5a and is connected with the earth 3 via the shunt resistance 4 (FIG. 7). The second electrode of the capacitor 301 is connected with the anode of the diode 303 and the first terminal of the resistor 302. The cathode of the diode 303 and the second terminal of the resistor 302 are connected with the source of the FET 5b and also connected with the start of the primary winding of the pulse transformer 8.

The capacitor 301 (third capacitor) is connected between a) a node, connected to the FET 5b (switching element connected to the second terminal of the DC/DC converter 2 of the power conditioning means) and to the primary winding of the pulse transformer 8, and b) the first terminal of the DC/DC converter 2. A parallel circuit formed of the diode 303 and the resistor 302 is connected between the node and the capacitor 301.

A description will now be given of the operation.

With the circuit configuration as shown in FIG. 15, the time constant of the capacitor 301 and that of the discharging path may be differentiated. In the standby period, the capacitor 301 is charged by a current supplied via the resistor 302. When the FET 5a is turned on after a transition from the standby period to the electrode heating period, the discharge takes place in the form of a current via the parallel circuit formed of the resistor 302 and the diode 303. In the AC conducting period, when the FET 5b is turned on and the FET 5a is turned off, the capacitor 301 is charged by a current that flows via the resistor 302. When the FET 5b is turned off and the FET 5a is turned on, the discharge takes place in the form of a current via the parallel circuit formed of the resistor 302 and the diode 303. During the standby period, the capacitor 301 is charged slowly at a rate determined by the time constant that depends on the resistor 302. Since the charging during the AC conducting period is such that the cycle period of ON•OFF of the FET 5a and FET 5b is so short compared with the standby period that the voltage of the capacitor 301 does not vary significantly. Further, since the gas discharge during the AC conducting period is effected by the electric current which flows in the parallel circuit formed of the resistor 302 and the diode 303, the variation in the electric charge of the capacitor 301 resulting from the gas discharge is small compared with a configuration in which the parallel circuit formed of the resistor 302 and the diode 303 is not provided as in the sixth embodiment. Therefore, the power loss due to the electrical charge and discharge of the capacitor 301 hardly occurs.

Thus, the eighth embodiment ensures that the igniter circuit is composed only of the pulse transformer, the bridge circuit is assigned the function of the switch, and the function of the capacitor for energy supply to the primary winding is covered by the smoothing capacitor at the output of the DC/DC converter. Therefore, of those components necessary for generation of the high-voltage pulse for the discharge starting, the circuit components other than the pulse transformer can be eliminated. Also, the auxiliary start-up circuit 6 and the inductor 7 are not necessary. Thus, the scale and cost of the device can be reduced.

Further, since the magnitude of energy to be supplied to the gas-discharge lamp continuously in the electrode heating period is optimized by providing the switching element in parallel with the second capacitor, the subsequent gas discharge is easily sustained.

A small low-cost circuit element of a small rated current can be used to implement the switching element arranged on the high-voltage side because the circuit configuration in which the switching element arranged on the high-voltage side need not be turned on at the discharge starting is employed. Another benefit is that the auxiliary start-up circuit 6 and the inductor 7 can be eliminated By differentiating between the time constant of the charging path of the third capacitor and the time constant of the discharging path thereof, the power loss produced in the third capacitor in the AC conducting period is reduced.

By causing a current to flow in the primary winding of the pulse transformer when the polarity is inverted in a transition from the electrode heating period to the AC conducting period, and when the polarity is inverted in an initial stage of the AC conducting period in a transition to the current feed by the second capacitor to the gas-discharge lamp, a large voltage is developed across the electrodes of the gas-discharge lamp. Accordingly, the dying out phenomenon that occurs when the polarity is inverted in a transition from the electrode heating period to the AC conducting period and during an initial stage of the AC conducting period is eliminated. As a result, an gas-discharge lamp lighting apparatus with an excellent lighting performance is obtained.

Ninth Embodiment

Figure 16:
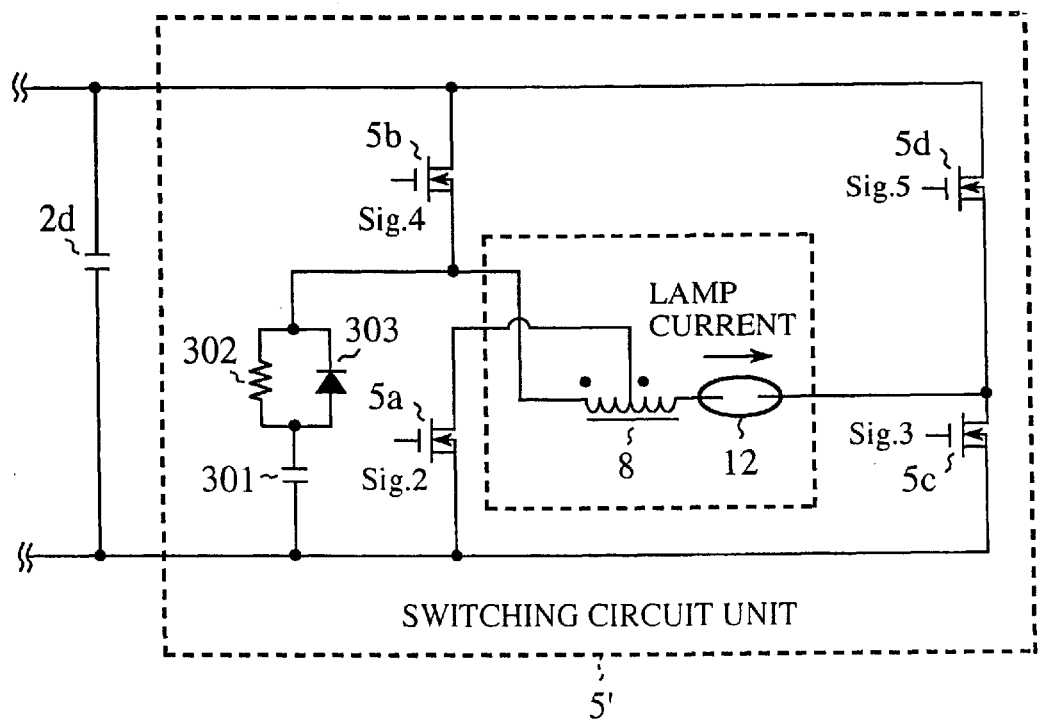
FIG. 16 shows a switching circuit unit of the gas-discharge lamp lighting apparatus according to a ninth embodiment of the present invention.
Figure 17:
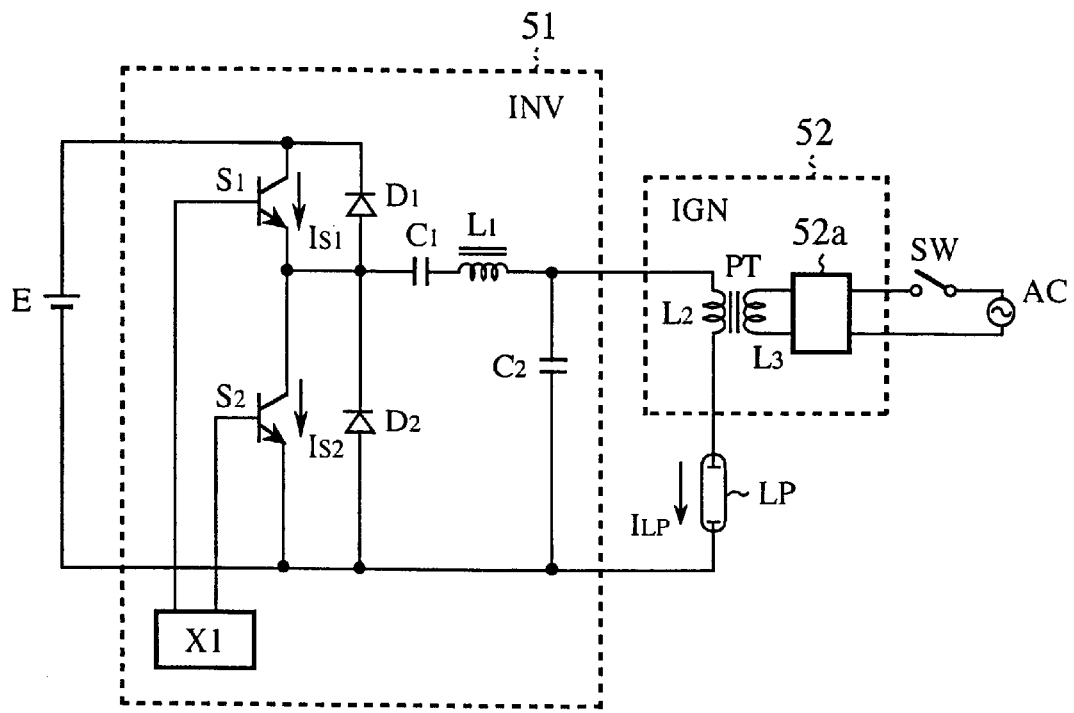
FIG. 17 shows a construction of an gas-discharge lamp lighting apparatus according to the related art.
Figure 18:
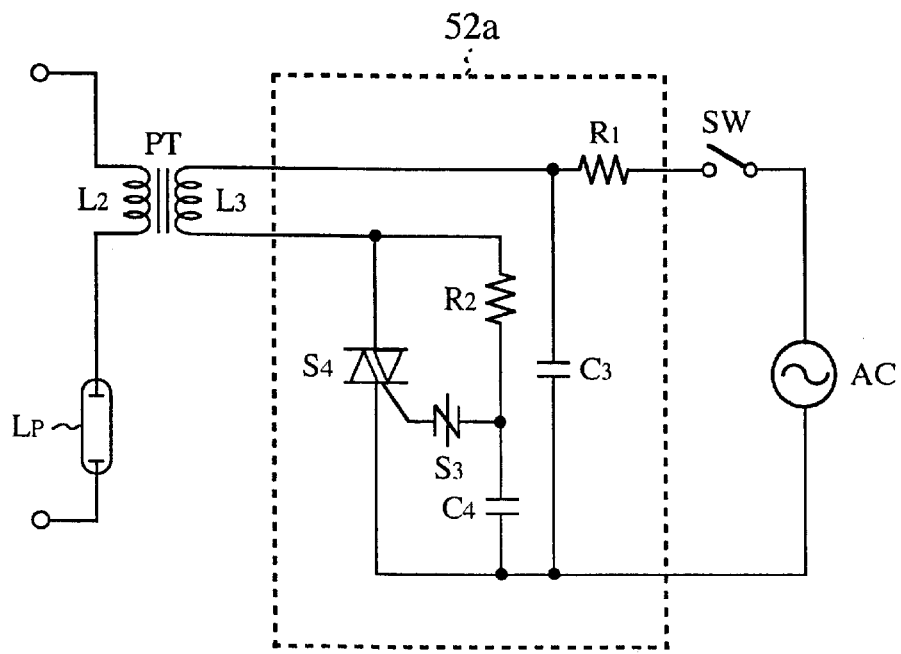
FIG. 18 shows a pulse generation circuit of an igniter circuit of the related-art gas-discharge lamp lighting apparatus.

FIG. 16 shows the switching circuit unit 5' of the gas-discharge lamp lighting apparatus according to the ninth embodiment of the present invention. Referring to FIG. 5, reference numeral 302 indicates a resistor, and 303 indicates a diode. The other constituting elements are identical to the corresponding elements of the seventh embodiment shown in FIG. 14.

In the ninth embodiment, the circuit system (FIG. 15) according to the eighth embodiment, which is an elaboration of the sixth embodiment (FIG. 13) applied to the half bridge circuit of the third embodiment (FIG. 7), is applied to the seventh embodiment (FIG. 14) applied to the fifth embodiment (FIG. 11) of the fifth embodiment.

In the seventh embodiment, every time the FETs 5a is turned on by switching during the AC conducting period, the electric charge of the capacitor 301 drains as a current in a closed circuit, the closed circuit being formed while the FET 5a is being turned on by capacitor 301-primary winding of the pulse transformer 8-FET 5a-capacitor 301. The power is consumed by the ON resistance of the FET 5a, producing the power loss. To prevent the power loss, the ninth embodiment employs a configuration as shown in FIG. 16.

A description will now be given of the connection.

In a similar configuration to the eighth embodiment, the first electrode of the capacitor 301 is connected with the source of the FET 5a and connected with the earth 3 via the shunt resistance 4 (FIG. 11). The second electrode of the capacitor 301 is connected with the anode of the diode 303 and the first terminal of the resistor 302. The cathode of the diode 303 and the second terminal of the resistor 302 are connected with the source of the FET 5b, and connected with the start of the primary winding of the pulse transformer 8. The capacitor 301 (third capacitor) is connected between a) a node, connected to the FET 5b (switching element connected to the second terminal of the DC/DC converter 2 of the power conditioning means) and to the primary winding of the pulse transformer 8, and b) the first terminal of the DC/DC converter 2. A parallel circuit formed of the diode 303 and the resistor 302 is connected between the node and the capacitor 301.

The operation according to the ninth embodiment is the same as that of the eighth embodiment so that the description thereof is omitted.

Thus, the ninth embodiment ensures that the igniter circuit is composed only of the pulse transformer, the bridge circuit is assigned the function of the switch, and the function of the capacitor for energy supply to the primary winding is covered by the smoothing capacitor at the output of the DC/DC converter. Therefore, of those components necessary for generation of the high-voltage pulse for the discharge starting, the circuit components other than the pulse transformer can be eliminated. Thus, the scale and cost of the device can be reduced.

Moreover, a small low-cost circuit element of a small rated current can be used to implement the switching element arranged on the high-voltage side of the gas-discharge lamp coupled to the pulse transformer. This is because the circuit configuration in which the switching element arranged on the high-voltage side need not be turned on at the discharge starting is employed. Another benefit is that the auxiliary start-up circuit 6 and the inductor 7 can be eliminated By differentiating between the time constant of the charging path of the third capacitor and the time constant of the discharging path thereof, the power loss produced in the third capacitor in the AC conducting period is reduced.

The present invention is not limited to the above-described embodiments, and variations and modifications may be made without departing from the scope of the present invention.

What is claimed is:

1. A gas-discharge lamp lighting apparatus comprising:
   power conditioning means regulating power supplied from a power source, outputting voltages with mutually different levels from first and second output terminals, and including a first capacitor coupled between the first and second output terminals;
   a switching circuit unit coupled between the first and second output terminals of said power conditioning means, comprising at least one switching element, and supplying an ac current to a gas-discharge lamp; and
   a pulse transformer generating a high-voltage pulse, and connecting the first and second output terminals of said switching circuit unit to the gas-discharge lamp, wherein said switching circuit unit connected to said pulse transformer causes said pulse transformer to generate a high voltage pulse.

2. The gas-discharge lamp lighting apparatus according to claim 1, including a second capacitor connected at a first end to the gas-discharge lamp, and at a second end to the first output terminal of said power conditioning means.

3. The gas-discharge lamp lighting apparatus according to claim 2, including a second switching element connected in parallel with said second capacitor.

4. The gas-discharge lamp lighting apparatus according to claim 2, wherein
   a current flows through the primary winding of said pulse transformer before a current is supplied from the second capacitor to the gas-discharge lamp so that a voltage between electrodes of the gas-discharge lamp is larger than a voltage maintained on said second capacitor, and
   the gas-discharge lamp is ac driven by alternately feeding a current from said power conditioning means and from said second capacitor.

5. The gas-discharge lamp lighting apparatus according to claim 1, further comprising initial current feed means supplying a current to the gas-discharge lamp upon starting of a discharge.

6. The gas-discharge lamp lighting apparatus according to claim 5, wherein said initial current feed means comprises:
   a parallel circuit of a resistor and a diode; and
   a series circuit of a second capacitor and an inductor connected in series.

7. A gas-discharge lamp lighting apparatus comprising:
   power conditioning means regulating power supplied from a power source, outputting voltages with mutually different levels from first and second output terminals, and including a first capacitor connected between the first and second output terminals;
   a switching circuit unit connected between the first and second output terminals of said power conditioning means and comprising first and second switching elements;
   a pulse transformer generating a high-voltage pulse, and connecting first and second output terminals of said switching circuit unit to a gas-discharge lamp, wherein a first terminal of a primary winding of said pulse transformer is connected to the first output terminal of said power conditioning means via said first switching element, and a second terminal of the primary winding of said pulse transformer is connected to the second output terminal of said power conditioning means via said second switching element; and
   a second capacitor connecting, the gas-discharge lamp to the first output terminal of said power conditioning means.

8. The gas-discharge lamp lighting apparatus according to claim 7, including a third switching element connected in parallel with said second capacitor.

9. The gas-discharge lamp lighting apparatus according to claim 7, including a third capacitor connected between a node that is connected to the second switching element and the primary winding, and the first output terminal of said power conditioning means.

10. The gas-discharge lamp lighting apparatus according to claim 9, including a parallel circuit comprising a diode and a resistor connected between said third capacitor and said node.

11. The gas-discharge lamp lighting apparatus according to claim 7, including a third switching element connected in parallel with said second capacitor.

12. The gas-discharge lamp lighting apparatus according to claim 7, further comprising initial current feed means supplying a current to the gas-discharge lamp upon starting of a discharge.

13. The gas-discharge lamp lighting apparatus according to claim 12, wherein said initial current feed means comprises:
   a parallel circuit including a resistor and a diode; and
   a capacitor and an inductor connected in series.

14. A gas-discharge lamp lighting apparatus comprising:
   power conditioning means regulating power supplied from a power source, outputting voltages with mutually different levels from first and second output terminals, and including a first capacitor connected between the first and second output terminals;
   a switching circuit unit connected between the first and second output terminals of said power conditioning means, wherein said switching circuit unit is a full-bridge inverter circuit comprising first and second switching elements in a first arm, and third and fourth switching elements in a second arm, and converting a dc output voltage of said power conditioning means into an ac voltage; and
   a pulse transformer generating a high-voltage pulse and connecting first and second output terminals of said switching circuit to a gas-discharge lamp, wherein a first terminal of the primary winding of said pulse transformer is connected to said first switching element, and a second terminal of the primary winding of said pulse transformer is connected to said second switching element.

15. The gas-discharge lamp lighting apparatus according to claim 14, including a second capacitor connected between a node that is connected to the first of said switching elements and the primary winding, and the first output terminal of said power conditioning means.

16. The gas-discharge lamp lighting apparatus according to claim 15, including a parallel circuit of a diode and a resistor connected between said second capacitor and said node.

17. The gas-discharge lamp lighting apparatus according to claim 14, further comprising initial current feed means supplying a current to the gas-discharge lamp upon starting of a discharge.

18. The gas-discharge lamp lighting apparatus according to claim 17, wherein said initial current feed means comprises:
- a parallel circuit including a resistor and a diode; and
- a capacitor and an inductor connected in series.

19. A gas-discharge lamp lighting apparatus comprising:
- power conditioning means regulating power supplied from a power source, and outputting voltages with mutually different levels from first and second output terminals;
- a switching circuit unit coupled between the output terminals of said power conditioning means and comprising at least one switching element;
- a capacitor in a circuit connecting the first output terminal of said switching circuit unit and a gas-discharge lamp; and
- a pulse transformer connected between said capacitor and the gas-discharge lamp, wherein a first terminal of a primary winding of said pulse transformer is connected to a first electrode of said capacitor, and a second terminal of the primary winding is connected to a second electrode of said capacitor via a switching element; and
- a charging circuit for charging said capacitor.

20. The gas-discharge lamp lighting apparatus according to claim 19, wherein said switching circuit unit comprises only one switching element.

21. The gas-discharge lamp lighting apparatus according to claim 19, wherein said switching circuit unit comprises two switching elements.

22. The gas-discharge lamp lighting apparatus according to claim 21, wherein
- current flows through the primary winding of said pulse transformer before current is supplied from said capacitor to the gas-discharge lamp so that a voltage between electrodes of the gas-discharge lamp is larger than a voltage maintained on said capacitor, and
- the gas-discharge lamp is ac driven by alternately feeding a current from said power conditioning means and from said capacitor.

23. The gas-discharge lamp lighting apparatus according to claim 19, wherein said charging circuit includes a charging circuit switching element.

* * * * *